United States Patent
Alleaume et al.

(10) Patent No.: US 12,367,643 B2
(45) Date of Patent: Jul. 22, 2025

(54) PROCESSING A TESSELATION

(71) Applicant: DASSAULT SYSTEMES, Vélizy-Villacoublay (FR)

(72) Inventors: Aurelien Jean Marie Alleaume, Montreal (CA); Nicolas Duny, Vélizy-Villacoublay (FR); Mark Loriot, Vélizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 192 days.

(21) Appl. No.: 18/169,529

(22) Filed: Feb. 15, 2023

(65) Prior Publication Data
US 2023/0290064 A1 Sep. 14, 2023

(30) Foreign Application Priority Data
Mar. 11, 2022 (EP) .................................... 22305281

(51) Int. Cl.
*G06T 17/10* (2006.01)
*G06T 5/30* (2006.01)
(Continued)

(52) U.S. Cl.
CPC .................... *G06T 17/20* (2013.01)

(58) Field of Classification Search
CPC ....... G06T 17/10; G06T 17/20; G06T 17/205; G06T 19/20; G06T 5/30;
(Continued)

(56) References Cited

U.S. PATENT DOCUMENTS

| 10,891,788 B2 * | 1/2021 | Van Der Velden ..... G06T 17/20 |
| 2002/0038201 A1 | 3/2002 | Balaven et al. |

(Continued)

FOREIGN PATENT DOCUMENTS

EP 3 327 593 A1 5/2018

OTHER PUBLICATIONS

Extended European Search Report issued Sep. 2, 2022, in European Patent Application No. 22305281.2, 9 pages.
Juretić, F., et al., "A Surface-Wrapping Algorithm with Hole Detection Based on the Heat Diffusion Equation", In: Quadros W.R. (eds) Proceedings of the 20th International Meshing Roundtable. Springer, Berlin, Heidelberg, 2011, 625 total pages.
(Continued)

*Primary Examiner* — Wesner Sajous
(74) *Attorney, Agent, or Firm* — Oblon, McClelland, Maier & Neustadt, L.L.P.

(57) ABSTRACT

The disclosure relates to a computer-implemented method for tessellation processing. The tessellation forms a surface representation of a real-world 3D object. The method comprises providing a constrained tetrahedral Delaunay mesh comprising the tessellation. The mesh is conformal and comprises one or more sets of tetrahedrons, each set representing a gap between portions of the tessellation, each gap having a size lower than a predefined threshold. The method further comprises determining a set of one or more tetrahedra faces of the mesh to be added to the tessellation, includes minimizing an objective function that includes a term penalizing surface creation by face addition to the tessellation. The minimization is under the constraint that a given set of tetrahedra faces of the Delaunay mesh is to be added to the tessellation. The given set of tetrahedra faces includes, for each gap of one or more gaps, the tetrahedra faces meshing the gap.

13 Claims, 15 Drawing Sheets

(51) Int. Cl.
*G06T 17/20* (2006.01)
*G06T 19/20* (2011.01)

(58) Field of Classification Search
CPC ... G06T 2219/2021; G06T 2207/30241; G06T 2210/12; G06T 15/08; G06T 13/40; G06T 7/20; G06N 3/08; G06N 3/09; G06N 3/0499; G06F 30/15; G06F 30/28
See application file for complete search history.

(56) References Cited

U.S. PATENT DOCUMENTS

2019/0197210 A1* 6/2019 Bonner .................. B33Y 50/00
2020/0034497 A1 1/2020 Goswami et al.
2022/0414282 A1* 12/2022 Wang ..................... G06T 17/20

OTHER PUBLICATIONS

Bischoff, S., et al., "Structure Preserving CAD Model Repair", Eurographics, vol. 24, No. 3, 2005, 10 total pages.
Campen, M., et al., "Exact and Robust (Self-)Intersections for Polygonal Meshes", Eurographics, vol. 29, No. 2, 2010, 10 total pages.
Attene, M., "Direct repair of self-intersecting meshes", Graphical Models, vol. 76, 2014, pp. 658-668.
Ju, T., "Fixing Geometric Errors on Polygonal Models: A Survey", J. Comput. Sci. & Technol., vol. 21, 2009, pp. 1-14.
Campen, M., et al., "A Practical Guide to Polygon Mesh Repairing", Eurographics, 2012, 61 total pages.
U.S. Appl. No. 18/072,455, filed Nov. 30, 2022, Thibault Dominique Marie Bernard Rose.

* cited by examiner

PROCESSING A TESSELATION

CROSS-REFERENCE TO RELATED APPLICATIONS

This application claims priority under 35 U.S.C. § 119 or 365 to European Application No. 22305281.2, filed Mar. 11, 2022. The entire contents of the above application are incorporated herein by reference.

TECHNICAL FIELD

The disclosure relates to the field of computer programs and systems, and more specifically to a method, system and program for processing a tessellation forming a surface representation of a real-world 3D object.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context and other contexts, processing a tessellation forming a surface representation of a real-world 3D object is often used.

Within this context, there is still a need for an improved method for processing a tessellation forming a surface representation of a real-world 3D object.

SUMMARY

It is therefore provided a computer-implemented method for processing a tessellation. The tessellation forms a surface representation of a real-world 3D object. The method comprises providing a constrained tetrahedral Delaunay mesh comprising the tessellation. The Delaunay mesh is conformal and comprises one or more sets of tetrahedrons. Each set represents a respective gap between portions of the tessellation. Each respective gap has a size lower than a predefined threshold. The method further comprises determining a set of one or more tetrahedra faces of the Delaunay mesh to be added to the tessellation. The determining includes minimizing an objective function. The objective function includes a term penalizing surface creation by face addition to the tessellation. The minimization is under the constraint that a given set of tetrahedra faces of the Delaunay mesh is to be added to the tessellation. The given set of tetrahedra faces includes, for each gap of one or more gaps, the tetrahedra faces meshing the gap.

The method may comprise one or more of the following:
- the minimization comprises providing an initial classification of the tetrahedrons of the Delaunay mesh into a first group and a second group, the first group comprising tetrahedrons that are inside a bounding box of the tessellation, the minimization having as free variable a classification of the tetrahedrons into the first and second groups, the constraint being that tetrahedrons meshing said one or more gaps belong to the first group;
- the minimization outputs a classification of the tetrahedrons into the first and second groups that defines an interface between the first group and the second group, and the determining of a set of one or more tetrahedra faces of the Delaunay mesh to be added to the tessellation further includes another minimization to further minimize the objective function by modifying the interface between the first group and the second group;
- said another minimization (S50) comprises:
    traversing the points of the Delaunay mesh which are on the interface but not on the tessellation, and assessing for each point whether moving the point further minimizes the objective function;
    determining one or more angles formed at the traversed points by edges of the mesh and having a value lower than a predefined threshold, and for each determined angle, inserting a point that is to be part of the interface so as to flatten the angle;
- the term is of the type:

$\text{Area}(\partial D(\omega)-S)$, where $\omega \in \Omega$ and $\Omega$ is the set of all tetrahedra classifications in the first and second groups, $\partial D(\omega)$ is the interface between the first and second groups in the classification $\omega$, S is the tessellation;
- the objective function further comprises a term of the type:

$\alpha \text{Area}(\partial D(\omega) \cap S)$ where $\alpha$ is a positive real number;
- the objective function further comprises a term of the type:

$\text{Area}(\pi D0(\omega) \cap S - \partial D(\omega))$, where $\pi D0(\omega)$ is the set of faces for all tetrahedra classified in the second group D0 in classification $\omega$;
- the providing of the constrained tetrahedral Delaunay mesh comprises:
    providing (S10) the tessellation;
    making the tessellation conformal and inserting the tessellation in a tetrahedral Delaunay mesh (S20);
- the method further comprises, prior to the determining of a set of one or more triangles of the Delaunay mesh to be added to the tessellation:
    locally refining the tetrahedral mesh of each gap;
- the determining of a set of one or more tetrahedra faces of the Delaunay mesh to be added to the tessellation is iterated, each iteration comprising, before the minimization, modifying the given set of tetrahedra faces;

the surface representation forms a delimitation of at least one fluid domain; and/or the surface represents an outer surface of a car body.

It is further provided a computer program comprising instructions for performing the method.

It is further provided a computer readable storage medium having recorded thereon the computer program.

It is further provided a system comprising a processor coupled to a memory, the memory having recorded thereon the computer program. The processor may also be coupled to a graphical user interface.

BRIEF DESCRIPTION OF THE DRAWINGS

Non-limiting examples will now be described in reference to the accompanying drawings, where.

DETAILED DESCRIPTION

Figure 1:
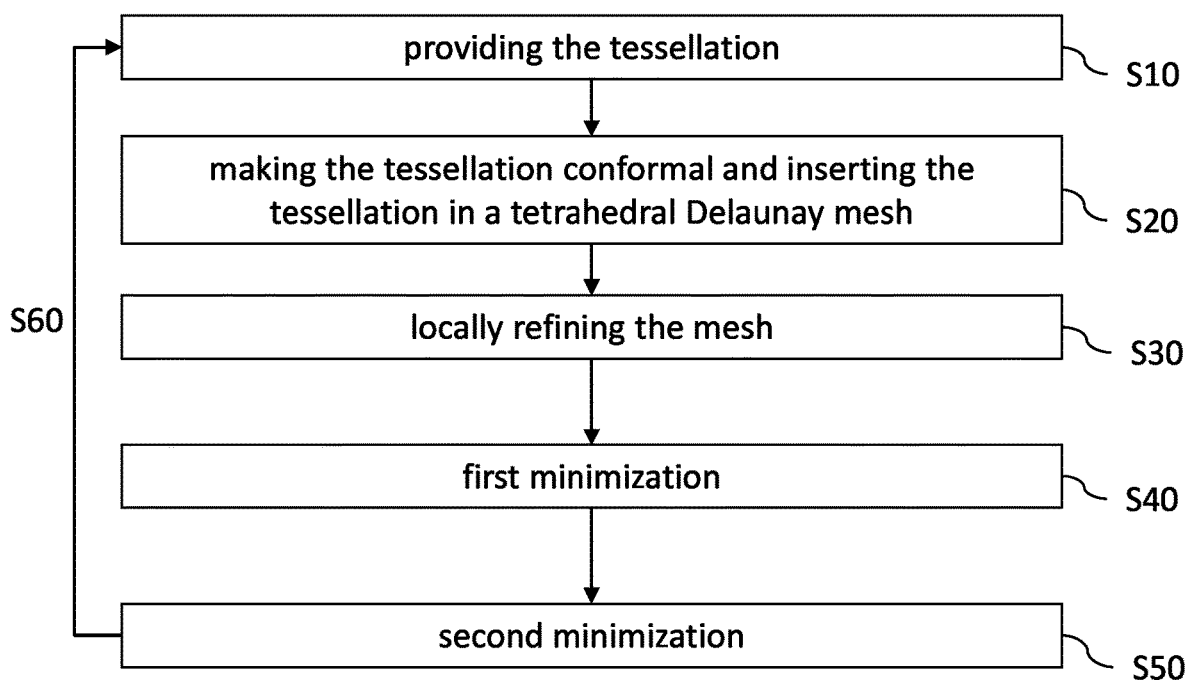
FIGS. 1, 2, 3, 4, 5, 6, 7, 8, 9, 10, 11, 12, 13, 14, 15, 16 and 17 illustrate the method.

With reference to the flowchart of FIG. 1, it is proposed a computer-implemented method for processing a tessellation. The tessellation forms a surface representation of a real-world 3D object. The method comprises providing S10-S20 a constrained tetrahedral Delaunay mesh comprising the tessellation. The Delaunay mesh is conformal and comprises one or more sets of tetrahedrons. Each set represents a respective gap between portions of the tessellation. Each respective gap has a size lower than a predefined threshold. The method further comprises determining a set of one or more tetrahedra faces of the Delaunay mesh to be added to the tessellation. The determining includes minimizing S40 an objective function. The objective function includes a term penalizing surface creation by face addition to the tessellation. The minimization is under the constraint that a given set of tetrahedra faces of the Delaunay mesh is to be added to the tessellation. The given set of tetrahedra faces includes, for each gap of one or more gaps, the tetrahedra faces meshing the gap.

This constitutes an improved method for processing a tessellation.

Notably, the method processes a tessellation forming a surface representation of the real-world 3D object in a manner that improves the quality of the tessellation. Indeed, the tessellation features gaps of a small size (i.e., of a size lower than a predefined threshold), corresponding to portions of the surface of the 3D object which are however not yet modelized or not yet tessellated (i.e., by the tessellation to process, i.e., the input tessellation). In other words, there are gaps between portions of the tessellation whereas these portions should be tessellated because they correspond to material portions of the real-world 3D object, and the method fills these gaps. For that, the method uses a constrained tetrahedral Delaunay mesh that includes the tessellation and determines one or more tetrahedra faces (i.e., triangles) of the mesh to be added to the tessellation. This determination is under the constraint that tetrahedra faces meshing one or more of the gaps are to be added to the tessellation (i.e., the given set of tetrahedra faces includes, for each gap of one or more gaps, some tetrahedra faces of a superset of tetrahedral meshing the gap). The method thereby fills the gaps not yet tessellated, i.e., tessellates them. This modifies the tessellation (by adding tetrahedra faces, i.e., triangles, to it) in manner that improves quality of the tessellation, since gaps are filled, and the tessellation thereby becomes or tends to become watertight and represents more accurately the material forming the 3D object. Furthermore, the Delaunay mesh used is conformal, and thus free of self-intersections, which also contributes to improving the quality. Moreover, the determination of the tetrahedra faces to add to the tessellation minimizes, under the previously-discussed constraint, the creation of surface that results from the addition of faces (i.e., tetrahedra faces, i.e., triangles) to the tessellation. In other words, the method fills gaps between portions of the tessellation, and thus adds tetrahedra faces to the tessellation, thereby creating surface, while minimizing the amount of surface that is thereby created. Thus, the method fills the gaps while tending to respect the surface representation of the real-world 3D object. Creating too much surface could modify the geometry of the tessellation in a too large extend so that it does not represent accurately the real-world object anymore, and the method thus avoids this.

Furthermore, the method for processing the tessellation is designed with the consideration that the method may be automated (i.e., all the steps of the method may be carried out automatically), thereby reducing user-machine interactions and time required for processing the tessellation. The method thereby avoids or at least reduces manual processing of the tessellation, and in particular manual filling of the gaps. Manual processing of the tessellation may require numerous direct and physical interactions between the user and the computer, i.e., interactions between the user and the computer using a haptic device (e.g., mouse clicks and/or other movements such as drag and drops, touches with a touch-sensitive display, keystrokes), which would require a long processing time and would objectively cause a physiological burden on the user. Indeed, full manual processing requires so many interactions (e.g., clicks) that a physiological burden is laid on the user's hands, fingers, and/or arms, which could cause physiological fatigue (e.g., repetitive strain injuries). The method avoids this and thereby improves ergonomics of the processing task. Furthermore, the time length of the tessellation processing is significantly reduced (e.g., from 100 hours down to 10 hours) as compared to non-automatic processing methods.

Moreover, the method is designed with the consideration that the tessellation processing according to the method can efficiently be performed on a computer, with a reduced consumption of CPU and/or GPU resources and with a reduced memory usage and footprint. Indeed, the method is designed with the purpose of not relying on a regular grid or an octree discretization of the tessellation (or of a space including the tessellation, e.g., a 3D space). Processing the tessellation so as to fill gaps by working on a with a regular grid or octree is highly dependent on the precision of the grid/octree and often requires a very high precision to be able to model accurately the real-world 3D object. These gaps are however of very small size (e.g., the predefined threshold may be of 10 mm or less), which would require a precision and resolution of the grid/octree which is so high that the consumption of CPU and/or GPU resources and the memory usage and footprint required for the processing would be unacceptably high (even not feasible on some computers). For example, loading a model of car with a high accuracy in a CAD software on a computer is critical in term of memory resources and CPU/GPU resources. As an example, this could take up to thirty minutes. In another example, if the model is on a server and has to be loaded on a client computer, the loading of a model of car with a high accuracy is critical in term of bandwidth between the server and the client server. To the contrary, the method relies on a Delaunay triangular mesh of quality (i.e., conformal, i.e., with no self-intersection) where the tessellation is inserted and performs an optimization that determines tetrahedra faces to be added to the tessellation. The resolution and precision of the Delaunay mesh thus has no or practically no influence on the CPU and/or GPU and memory usage in the computations, the Delaunay mesh being a non-structured mesh as opposed to the structured meshes which are the grids or octrees. Rather, the CPU and/or GPU and memory usage depend on the number of triangles (i.e., tetrahedra faces), since these triangles/tetrahedra faces correspond to the free variables of the optimization. This greatly reduces the CPU and/or GPU and memory usage as compared to solutions based on a grid or an octree, e.g., one or two orders of magnitude less of memory usage for the claimed method as compared to grid-based or octree-based solutions for the same precision in the capture of the input geometry.

The method outputs the processed tessellation, which is the input tessellation but with triangles added as a result of the minimization(s), may be efficiently used in a simulation. Indeed, because the processed tessellation is of high quality, without self-intersections and with filled gaps, it may efficiently be used in a simulation that uses the tessellation as discretization of the real-world 3D object. The simulation is more accurate, features less numerical artefacts, if of high quality, because the tessellation is of high quality. Additionally, the whole simulation process may be automated as the method may be automated. The improved use of computing and memory resources for processing the tessellation is all the more significant when the tessellation is then used for simulation, as this use often takes place in a design and simulation process (e.g., prior to a downstream manufacturing as discussed hereinafter), in which context the design and simulation are often iterated. The simulation may be a CFD (Computational Fluid Dynamics) simulation, the surface representation forming in this case the delimitation of at least one fluid domain, e.g., an outer surface of a car body. The method processes this surface representation and fills the gaps, thus making it watertight at the proper locations, thereby improving the delimitation of the fluid domain(s) and allowing an improved fluid simulation to be performed. The simulation may alternatively be an electromagnetism simulation, where all the surfaces of the object to simulate are connected by the method so as to perform electromagnetic computations.

The input tessellation may be a surface representation of the outer surface of a car body, the tessellation resulting for example from a design process. This surface comprises gaps. This may result from the design process, as at the stage of the design and before simulation or manufacturing, the designer may design the global body structure design of the car, but without details such as gaskets, e.g., between the car body and the wipers. The method processes this surface representation and fills the gaps between portions of the surface representation, thereby outputting a watertight surface representation of the car body comprising all the details (e.g., the gaskets). This allows to perform a CDF simulation on the basis of the processed surface representation, e.g., a simulation of aerodynamism. The accuracy and quality of the simulation is improved, as the tessellation representing the car body is watertight. Ultimately, downstream to the design and to the simulation, this allows to manufacture a car exhibiting improved aerodynamics. The method may notably handle the case for a car body with a specific geometry (e.g., a class A vehicle) or complex geometry (e.g., a full vehicle, with the wipers, the motor block, the muffler), where the method still finds the triangles to fill the gaps and thus allows a downstream accurate CFD simulation.

The real-world 3D object may be a manufacturing product, i.e., a manufacturable product such as a mechanical part, to be manufactured downstream to the method. The product may be manufactured directly based on the processed tessellation, i.e., the processed tessellation may be the basis of a further downstream manufacturing of the product. The method may thereby be included in a design and manufacturing process, which may comprise:

- designing the input tessellation that represents a manufacturing product (e.g., a car body structure as previously discussed);
- performing the method, thereby processing the input tessellation by filling gaps between portions of the input tessellation (e.g., thereby obtaining a watertight and detailed car body), and outputting the processed tessellation;
- optionally, performing a simulation of a physical behavior or performance of the 3D object on the basis of the processed tessellation (e.g., performing a CFD simulation, for example an aerodynamism simulation, of the car body);
- manufacturing the real-world product, based on the processed tessellation.

The inclusion of the method in a design and manufacturing process is further discussed hereinafter.

The method is now further discussed.

The method is for processing a tessellation. Processing a tessellation means taking a input the tessellation and performing a modification of the tessellation, and output the modified tessellation. In the case of the method, the processing modifies the tessellation by adding one or more triangles (i.e., tetrahedra faces) to it, to fill the gaps in the tessellation. The tessellation to be processed/modify by the method (i.e., the tessellation before adding the triangles) may be referred to as "the input tessellation".

The tessellation may stem from a process of obtaining the tessellation. The method may comprise performing such a process, as an initial step of the method (i.e., before the other steps of the method). The tessellation is herein a triangulated surface forming a surface representation of the 3D real-world object, e.g., representing an outer surface or skin thereof, and therefore forms. a discrete geometrical surface representation of the 3D object. The discrete geometrical representation is herein a data structure which comprises a discrete set of pieces of data. Each piece of data represents a respective surface geometrical entity (e.g., a triangle) positioned in a 3D space. Each geometrical entity represents a surface portion of the 3D object. The aggregation (i.e., union or juxtaposition) of the geometrical entities represents altogether the 3D object. Obtaining the tessellation may comprise designing the tessellation, e.g., in a mechanical design process on a CAD system. Mechanical design means herein designing a tessellation representing the real-world object so that it satisfies mechanical, physical use and/or manufacturing requirements (which notably excludes creating the tessellation only for aesthetic purposes). Obtaining the tessellation may alternatively comprise obtaining the tessellation as a result of a 3D reconstruction process, as discussed hereinbelow.

The discrete geometrical representation is herein a surface mesh, each geometrical entity being a mesh tile or face. The mesh is a triangular mesh (i.e., the faces are triangles). The mesh may be obtained from a 3D point cloud, for example by triangulating the 3D point cloud (e.g., with any suitable triangulation process). The 3D point cloud herein may be stem from physical measurements on the mechanical part, for example within a 3D reconstruction process. The 3D reconstruction process may comprise providing the real-world 3D object, providing one or more physical sensors each configured for acquiring a respective physical signal, and acquiring one or more respective physical signals by operating the one or more physical sensors on the 3D object (i.e., scanning the mechanical part with each sensor). The 3D reconstruction may then automatically determine a 3D point cloud and/or a 3D mesh based on the measurements, according to any known technique. The one or more sensors may comprise a plurality of (e.g., RGB, and/or image or video) cameras and the determination may comprise a structure-from-motion analysis. The one or more sensors may alternatively or additionally comprise one or more depth sensors (e.g., on an RGB-depth camera) and the determination may comprise a 3D reconstruction from depth data. The one or more depth sensors may for example comprise a laser (e.g., a lidar) or an ultrasound emitter-receiver.

The method comprises providing S10-S20 a constrained tetrahedral (i.e., 3D) Delaunay mesh comprising the tessellation. The Delaunay mesh is conformal. The concept of Delaunay mesh is widely known (see en.wikipedia.org/wiki/Delaunay_triangulation), and the concept of conformal mesh as well (see en.wikipedia.org/wiki/Mesh_generation). A conformal mesh is a mesh which has a structure of a CW complex. Such a mesh is a mesh that does not comprise any self-intersection, i.e., the intersection between any two elements of the mesh is a sub-element of both or the void set. The Delaunay mesh is constrained in that it is a Delaunay mesh comprising another mesh, namely the tessellation. Providing the Delaunay mesh may comprise retrieving the Delaunay mesh, e.g., from a (e.g., distant) database or memory where the Delaunay mesh has been stored further to its obtention. For example, the retrieving may comprise accessing the database or memory and downloading the Delaunay mesh. Alternatively, providing the constrained Delaunay mesh may comprise providing S10 the tessellation (e.g., by obtaining it as previously discussed or by retrieving an already obtained tessellation from a memory), and making S20 the tessellation conformal and inserting S20 the tessellation in a tetrahedral Delaunay mesh. Making the tessellation conformal means transforming the tessellation into a conformal tessellation (i.e., into a conformal triangular mesh), by applying any known method suitable for this purpose. If the input tessellation is already conformal, then S20 only comprises inserting the tessellation in a tetrahedral Delaunay mesh. Inserting S20 the tessellation in the tetrahedral Delaunay mesh means determining a Delaunay mesh that includes (i.e., as part of the meshing), the tessellation, i.e., the Delaunay mesh is constrained to feature the tessellation. For that, any known method for determining/generating a constrained Delaunay mesh may be applied.

There are two major approaches for correcting into a clean triangular mesh a tessellation that contains inconsistencies like intersections:

Surface based approaches, which consist in identifying patches and intersect them explicitly, possibly using exact arithmetic. These algorithms only locally modify the input patches, but due to numerical issues cannot guarantee a consistent, volume-representing, output mesh, and Volumetric based approaches, which use a signed distance grid as an intermediate representation and are able to produce guaranteed reconstructions. However, these algorithms lose many information from the input tessellation due to a global rebuild stage, and this resampling is strongly affected by the resolution of the underlying volume grid.

Making S20 the tessellation conformal in the method may be carried out as discussed in reference Bischoff et al., "*Structure Preserving CAD Model Repair*", which is incorporated herein by reference, and which combines both approaches discussed above to limit the side effects by using a local voxel grid near cracks and intersections. Alternatively, making S20 the tessellation conformal in the method may be carried out as discussed in reference Campen et al, "*Exact and Robust (Self-)Intersections for Polygonal Meshes*", which is incorporated herein by reference, and which, similarly, uses an octree grid with nested binary space partitions to achieve a local volume representation to achieve a robust and exact intersection of tessellations. Alternatively, making S20 the tessellation conformal in the method may be carried out as discussed in reference Attene, "*Direct repair of self-intersecting meshes*", which is incorporated herein by reference, and which works directly on the input tessellation and relies on floating point arithmetic whenever possible, exact constructions only when ambiguities occur. Alternatively, making S20 the tessellation conformal in the method may be carried out as discussed in the practical guides and surveys that can be found in references Tao Ju, "*Fixing geometric errors on polygonal models: A survey*" and Campen et al, "*A Practical Guide to Polygon Mesh Repairing*", which are both incorporated herein by reference. Reference Campen et al, "*A Practical Guide to Polygon Mesh Repairing*", proposes a practical guide to polygon mesh repairing in reference Attene, "*Direct repair of self-intersecting meshes*", where the exploitation of state of-the-art techniques are used to solve defects such as intersections.

As known per se, the Delaunay mesh is made of a set of tetrahedrons each bounded by four tetrahedra faces (i.e., four triangles), each itself bounded by tree edges, each itself bounded by two vertices. A vertex of the Delaunay mesh or of the tessellation may also be referred to as "a point". The Delaunay mesh comprises one or more sets of tetrahedrons each representing a respective gap between portions of the tessellation. In other words, among the tetrahedrons forming the Delaunay mesh, there is one or more sets of tetrahedrons, and each respective one of these one or more sets is a set of tetrahedrons that represent a respective gap between portions of the tessellation, i.e., that meshes a part of the 3D space that is between two portions of the tessellation and that represents a gap between these portions, i.e., a region that ought to be tessellated by that is actually not in the input tessellation. Each one of these one or more gaps has a size lower than a predefined threshold. The size may be the maximal dimension of the gap or of a bounding box thereof, i.e., a maximal dimension of the volume formed by the tetrahedrons meshing the gap or by a bounding box thereof. The threshold may be comprised between 1 micron and 10 mm, for example 1 mm and 5 mm, e.g., when the input tessellation represents an outer car body surface (e.g., to be simulated in a aerodynamics simulation). The threshold may be provided by the user at an initial stage of the method. The method may comprise, e.g., as an initial step, or for example during optional step S30 discussed hereinafter, automatically detecting the gaps, for example based on their side.

Further to the providing S10-S20 of the constrained tetrahedral Delaunay mesh, the method then comprises determining a set of one or more tetrahedra faces (i.e., triangles) of the Delaunay mesh to be added to the tessellation. This means that the method searches among the tetrahedrons of the Delaunay mesh which tetrahedrons have a face that should be added to the tessellation so that the tessellation fills (i.e., tessellates) one or more gaps once processed (e.g., in order to fill all the gaps of which size is lower than the predefined threshold). Adding a face (i.e., a triangle) to the tessellation means that, the tessellation being stored as a computer object (e.g., a list of the triangles forming the tessellation), the face is stored in this same computer object (e.g., the face is added to the list of triangles forming the tessellation).

The determination of this set of tetrahedra face(s) to be added to the tessellation includes minimizing S40 an objective function under a constraint. Minimizing the objective function under the constraint means that the method searches, among the values of the free variable (or free variables) of the function, a value for which the function achieves a minimum, the search being constrained by the constraint (i.e., the search is limited to the values for which the constraint is respected). For performing the minimization S40, the method may use any suitable known minimization problem, for example a metaheuristic approach close to simulated annealing.

The objective function is a function that includes a term penalizing surface creation by face addition (i.e., tetrahedra face addition, i.e., triangle addition) to the tessellation. The free variable(s) of the minimization correspond to the set of tetrahedrons of the Delaunay mesh. The minimization thereby searches a configuration of these tetrahedrons which minimize the objective function. The objective function includes a term penalizing surface creation by face addition, i.e., a term that tends to be large (i.e., to have a large value) when surface creation happens as a consequence of face addition to the tessellation, whereas the value of the objective function is to be minimized. The minimization thereby searches tetrahedra faces to add to the tessellation while respecting the initial geometry and shape of the input tessellation, since adding surface to the tessellation, by face addition, is constrained to happen but limited by the term minimization. The initial geometry and shape of the input tessellation thereby tends to be respected by the minimization which adds to the tessellation only those tetrahedra faces which are truly necessary to add to fill the gap(s) (i.e., the gaps are not overfilled with added triangles). Furthermore, the quality (e.g., the resolution) of the input tessellation is also thereby preserved. Optionally, the objective function may comprise another term which allows the method to handle with improved accuracy tessellation representing a geometry bounded or at least partially bounded by open surfaces, e.g., a term penalizing addition to the tessellation of tetrahedra faces meshing real holes of the 3D modeled object. The objective function may additionally or alternatively comprise yet another term that is a stabilizing term and that reduces the number of solutions to the minimization The minimization is under the constraint that a given set of tetrahedra faces of the Delaunay mesh is to be added to the tessellation. In other words, although the minimization tends to limit surface creation by face addition to the tessellation (since the term penalizing surface creation is to be minimized), the minimization is however constrained to add at least some tetrahedra faces to the tessellation, i.e., those of the given set. This given set includes, for each gap of one or more gaps (e.g., for each gap of the one or more gaps of which size is lower than the predefined threshold), the tetrahedra faces meshing the gap (i.e., the given set of tetrahedra faces includes, for each gap of one or more gaps, some tetrahedra faces of a superset of tetrahedral meshing the gap). The constraints thereby ensures that the gaps to fill are filled with tetrahedra faces while said term in the objective function ensures that only the faces truly necessary to fill the gaps are added to the tessellation. The given set may include other tetrahedra faces, e.g., faces of tetrahedra meshing an inside portion (e.g., the inside) of the 3D real-world object. The given set may for example include all the tetrahedra faces which are inside a bounding box of the input tessellation. The bounding box may be any type of bounding box, e.g., a cuboid, a rectangle cuboid, or a sphere. The bounding box may also be a bounding volume of the real-world object formed by the tessellation, e.g., a convex hull formed by the tessellation.

The minimization S40 may comprise providing an initial classification of the tetrahedrons of the Delaunay mesh into a first group and a second group. The classification may be any computer object that allows to associate each tetrahedrons of the mesh to either the first group or the second group, e.g., a set of binary values or a labelling. The classification may for example be a set of the values taken by a classification function on the tetrahedrons of the Delaunay mesh, i.e., each value of the set is respective to a respective tetrahedron of the mesh and is a value taken by the classification function on this tetrahedron. The classification function may have two values (i.e., takes its values in a set having two elements/values, e.g., the set {0,1}): a first value that indicates the belonging to the first group, and a second value that indicates the belonging to the second group. For example, the first value may be 0 and the second value may be 1, or the first value may be 1 and the second value may be 0. Alternatively, the values may be labels. Providing the initial classification means initializing the values or labels of the tetrahedrons of the mesh.

In this case, The minimization S40 has as free variable a classification of the tetrahedrons into the first and second groups. In other words, the minimization S40 searches for a classification that minimizes the objective function and may thus modify the classification of the tetrahedrons during this search. The constraint is in this case that (e.g., all the) tetrahedrons meshing said one or more gaps belong to the first group. In other words, the minimization S40 may modify the classification of the tetrahedrons (i.e., modifying the classification of some tetrahedrons, e.g., by modifying values of the classification function of these tetrahedrons) only to the extent that the tetrahedrons meshing said one or more gaps are mandatorily classified in the first group. The constraint may for example be that all the tetrahedrons which are inside the previously-discussed bounding box of the input tessellation are mandatorily classified in the first group, which implies in particular that the tetrahedrons meshing the gaps are mandatorily classified in the first group The first group comprises (i.e., in the initial classification) tetrahedrons that are inside a bounding box of the tessellation, e.g., all the tetrahedrons that are inside a bounding box of the tessellation. The second group may comprise (i.e., in the initial classification) all the other triangles, i.e., which are outside the bounding box. As previously said, the bounding box may be any type of bounding box, e.g., a cuboid, a rectangle cuboid, a sphere, or a bounding volume of the real-world object formed by the tessellation, e.g., a convex hull formed by the tessellation. The first group may be referred to as "the inside" and the second group as "the outside".

The minimization S40 may thereby output a classification if the tetrahedrons into the first and second groups that minimizes or tends to minimize the objective function (i.e., the objective function achieves a value for the outputted classification that is or tends to be its minimum). The outputted classification defines an interface between the first group and the second group. In other words, each tetrahedron either belongs to the first group or to the second group in the outputted classification, and there are triangles (i.e., tetrahedra faces) that are each shared by a tetrahedron classified in the first group and a tetrahedron classified in the second group. These triangles form the interface, i.e., the interface consists in (e.g., a list of) all these triangles.

The determining of a set of one or more tetrahedra faces of the Delaunay mesh to be added to the tessellation may then further include another minimization S50 to further minimize the objective function by modifying the interface between the first group and the second group. In other words, this other minimization S50 has the same objective function to minimize as the first minimization S40 and the same constraint, but instead of having as free variable the classification of all the tetrahedrons of the Delaunay mesh, this other minimization S50 has as free variable the interface. In other words, this other minimization searches for modifications (if any) of the interface (e.g., geometrical modifications) that further minimize the objective function, i.e., that decrease the value of the objective function as compared to the value of this function for the classification outputted by the minimization S40. The minimization S40 may be referred to as the "first minimization" and the other minimization S50 may be referred to as the "second minimization". The second optimization S50 allows to optimize with varying topology (since the interface is modified), while the first minimization S40 preserves the topology and acts on the classification only. This twostep approach improves the quality of the result.

The second minimization S50 may comprise traversing the points of the Delaunay mesh which are on the interface but not on the tessellation (i.e., on the input tessellation, before the first minimization S40). In other words, the second minimization visits (i.e., explores), one by one, the points (i.e., vertices) of the Delaunay mesh which are on the interface (i.e., shared by tetrahedrons of the two groups) but which do not belong to the input tessellation. In this case, the second minimization S50 also comprises assessing, for each such point, whether moving the point further minimizes the objective function. Moving the point may comprise bringing the point closer to another point of the interface along a given direction (e.g., a direction of an edge having the point as vertex), provided that doing so decreases the value of the objective function. Moving a point may modifying tetrahedron edges (by edge swapping or splitting), in order to make the aforementioned move possible (i.e., preserving the conformity of the mesh). The second minimization S50 may further comprise determining one or more angles formed at the traversed points by edges of the mesh and having a value lower than a predefined threshold. Each such angle is an angle formed by two triangles of the Delaunay mesh that both belong to the interface and that intersect at point/vertex of the interface (i.e., the traversed point). The predefined threshold may be 90° (i.e., the determined angles are the acute angles formed by intersecting/connected edges of the interface), or 45°. In this case, the second minimization S50 comprises, for each determined angle, inserting a point that is to be part of the interface so as to flatten the angle (i.e., inserting a point provides an additional degree of freedom to the ongoing minimization, with the purpose of further optimizing the objective function and thus to flatten the angle). Inserting a point means adding a point to the Delaunay meshing. Adding the point may comprise adding a point on an existing edge, thereby dividing the edge in two, and/or creating a new point and edges for connecting the point to the interface, the created point and edges being part of the interface.

The term may be of the type $$\text{Area}(\partial D(\omega) - S),$$

where $\omega \in \Omega$ and $\Omega$ is the set of all tetrahedra classifications in the first and second groups, $\partial D(\omega)$ is the interface between the first and second groups in the classification $\omega$, S is the tessellation.

The objective function may further comprise a term of the type:

$$\alpha \text{Area}(\partial D(\omega) \cap S)$$

where $\alpha$ is a positive real number. $\alpha$ may be lower than 1, for example lower than 0.5, for example lower than or equal to 0.1, e.g., equal to 0.01. This term is a stabilizing term, that leads to a lower number of minimal solutions.

Additionally or alternatively, the objective function may further comprise a term of the type:

$$\text{Area}(\pi D0(\omega) \cap S - \partial D(\omega)),$$

where $\pi D0(\omega)$ is the set of faces for all tetrahedra classified in the second group D0 in classification $\omega$. This term penalizes addition to the tessellation of tetrahedra faces meshing real holes of the 3D real-world object surfaces, thereby improving the method when working on geometries bounded by open surfaces (as opposed to a model made as an assembly of surface shells).

The objective function may in examples be the sum of the term penalizing surface creation and of one or both of the other terms discussed above. In examples, the minimization problem is:

$$\operatorname{argmin}\{(\text{Area}(\partial D(\omega) - S) + \alpha \text{Area}(\partial D(\omega) \cap S) + \text{Area}(\pi D0(\omega) \cap S - \partial D(\omega))), \omega \in \Omega; C(w)\}$$

where $C(\omega)$ is a constraint function whose value is true if and only if the constraint is satisfied for classification $\omega$.

The method may further comprise, prior to the determining of a set of one or more tetrahedra faces of the Delaunay mesh to be added to the tessellation, locally refining S30 the tetrahedral meshing of each gap. Locally refining the tetrahedral meshing may be carried out by any known method (e.g., any suitable Delaunay meshing method), and comprises adding tetrahedrons to the tetrahedral meshing of each gap (i.e., each part of the Delaunay meshing that meshes one of the gaps), e.g., by adding vertices and connecting them to existing vertices, the meshing being thereby locally refined. Locally refining may comprise ensuring that no edge meshing a gap connects the two tessellation portion separated by the gap. The refining S30 improves the quality of the subsequent optimization S40 (and optionally S50) as it provides more degrees of freedom for the optimization.

The determining of a set of one or more tetrahedra faces of the Delaunay mesh to be added to the tessellation may be iterated S60. Each iteration comprises, before the minimization S40, modifying the given set of tetrahedra faces, e.g., by modifying the constraint being that tetrahedrons meshing said one or more gaps belong to the first group, and optionally modifying the initial classification of the tetrahedrons of the Delaunay mesh.

As previously discussed, further to the first minimization S40, and optionally the second minimization S50, the method outputs (i.e., at each iteration S60, where appropriate) a processed tessellation which includes the added tetrahedra faces (i.e., triangles). For example, the input tessellation may be a list of triangles, and the output tessellation may be this list to which are added the added triangles as determined by the minimization S40, and optionally the minimization S50. The method may further comprise performing a volume meshing based on the output tessellation, i.e., finding a volume mesh that meshes the solid geometry of the real-world object and that matches the output tessellation which meshes the surface geometry. This may be done by any known method.

An implementation of the method is now discussed.

This implementation may be used in the 3D simulation area, by providing a very robust way of generating tetrahedral meshes for 3D numerical simulation. This implementation may also be used for model preparation by providing an augmented discrete surface geometry representation where geometry issues are addressed. In particular gaps in the geometry are filled and geometries are united, with an automatic discrete non regularized unite operation. The implementation provides high precision: capture input discrete geometry exactly (1 micron precision) while being able to fill gaps of 10 mm in the geometry. The implementation also provides consistency of the result: provide a well-defined result that can be explained more explicitly than heat-transfer iso-surfaces. The implementation also improves the speed and memory consumption, which are kept under control as independently as possible from the precision expected (as opposed for example to octree/grid based rediscretization).

This implementation implements a wrapping process in a resilient and constrained 3D Delaunay workflow. In this context, the implementation solves an optimization problem (under constraint) of the classification of tetrahedra between two domains representing the inside and outside of a geometry. Moreover, performing this operation in a tetrahedral representation of the space, generated by a constrained-3D Delaunay workflow, this implementation achieves a very precise result compared to a similar process that would be performed in an approximated grid or voxel representation (like one may usually obtain with a space discretization obtained from a regular grid or from an octree).

The implementation allows the following:
High precision: capture input discrete geometry exactly (1 micron precision (default precision), or more accurate (upon request)), while being able to fill gaps of 10 mm (or more) in the tessellation;
Consistency: provide a consistent and well-defined result that can be directly and explicitly explained as the result of an optimization problem;
The speed and memory consumption are reasonable, almost independently on the precision expected in the capture of the existing discrete geometry;
The ability to capture domains, independently of their nature (internal or external fluid domains for example);
The possibility to define constraints. For example:
The distance below which gaps should absolutely be closed; and/or
Some surfaces that must be exposed to the domain or that shall not (for example, lids closing a fluid domain definition).

Figure 2:
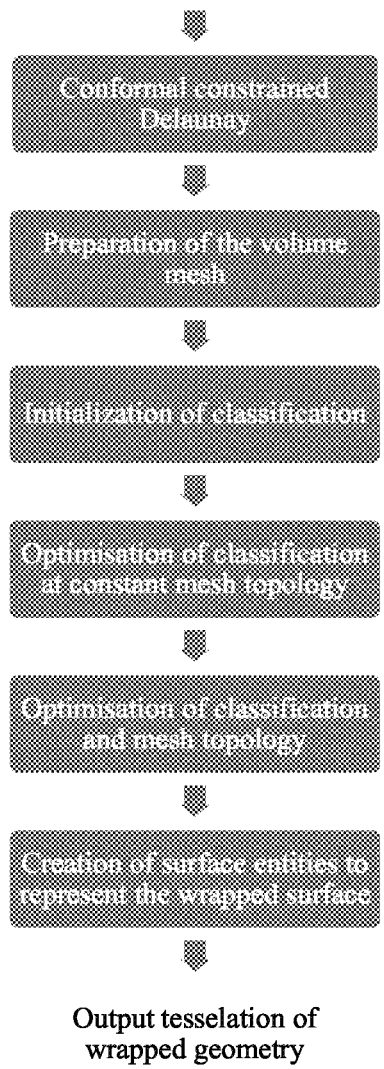
Figure 3:
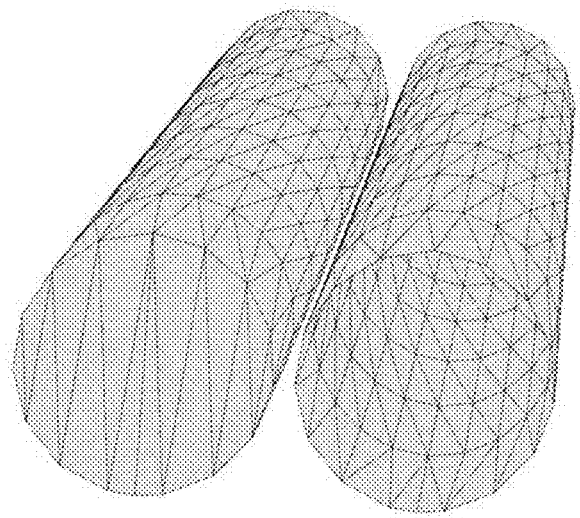
Figure 4:
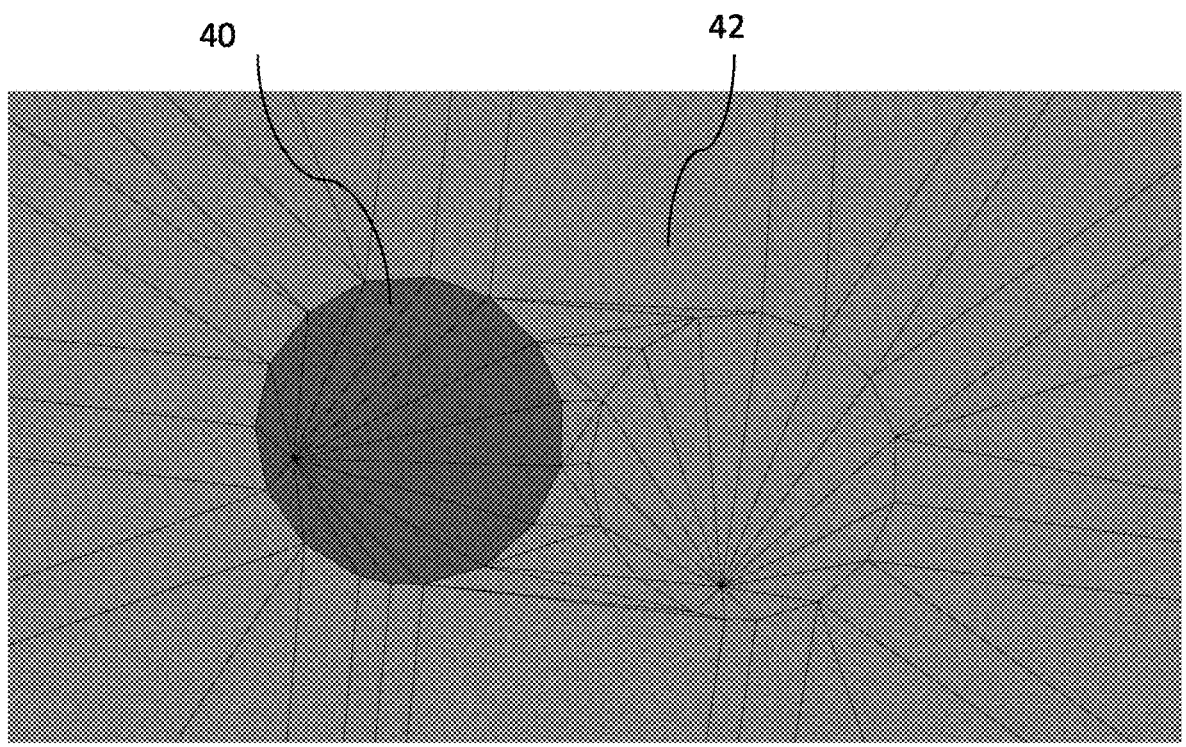

The implementation follows the flowchart shown in FIG. 2, which shows the global method for this wrapping process. The implementation is now discussed with reference to this flowchart and, without any loss of generality, for an illustrating example involving a simple geometry in order to be able to highlight reasonably well the process inside the volume simplicial discretization. This geometry is made of one closed cylinder and one open cylinder separated by a small distance of 0.25 mm. FIG. 3 shows the input tessellation of this geometry Step 1: Providing S10-S20 a Conformal Constrained Delaunay Mesh that Includes the Tessellation The first step of the process is to insert the input surface triangles in a conformal tetrahedral mesh. As previously discussed, any method for obtaining a suitable constraint Delaunay mesh and making it conformal may be used in step 1. FIG. 4 illustrates this step and shows that at this stage, one may identify two components of tetrahedral: the inside 40 of the closed cylinder and the outside 42. The inside of the open cylinder is considered as outside.

Step 2: Preparation of the Volume Mesh/Locally Refining the Volume Mesh

Figure 5:
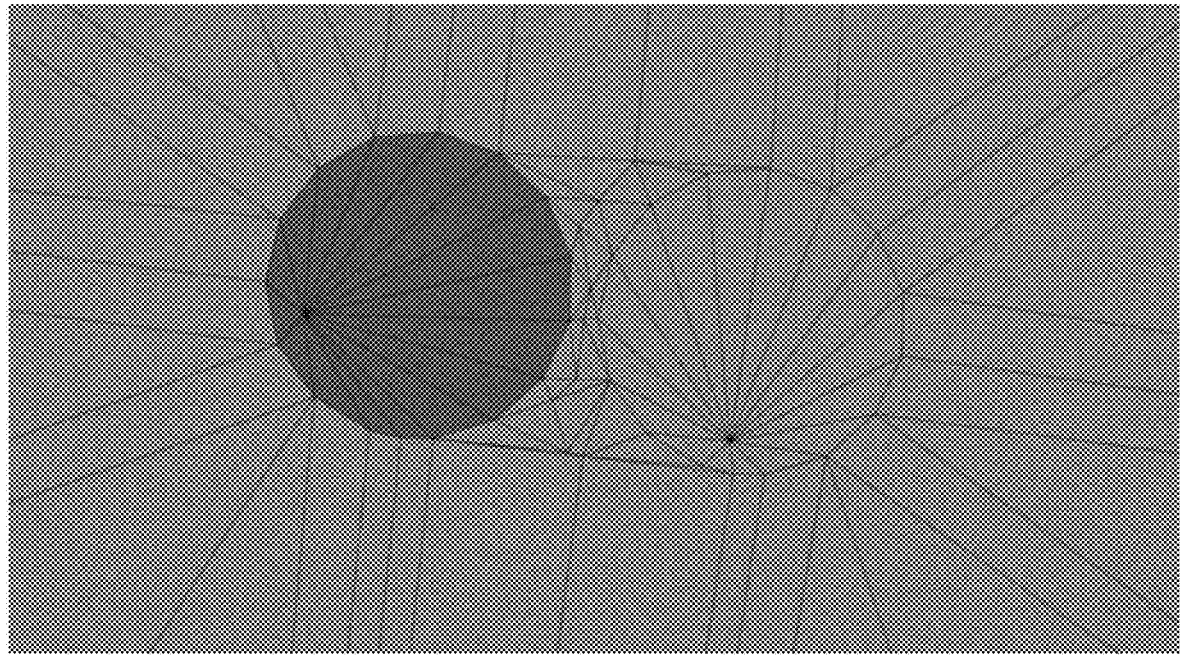

The tetrahedral volume mesh provided in step 1 has a density directly linked to the input surface mesh. This step allows to refine and optimize the volume mesh in the zones of interest in order to provide enough degrees of freedom for the optimization occurring in the next steps. This steps optimizes and refines the volume within the gaps that the wrapping process is to close. FIG. 5 illustrates this step for the same location as FIG. 4. The main zone of interest requested here was the gap between surfaces closer than 0.3 mm, in other words the gap between the two cylinders.

Step 3: Initialization of the Classification

Figure 6:
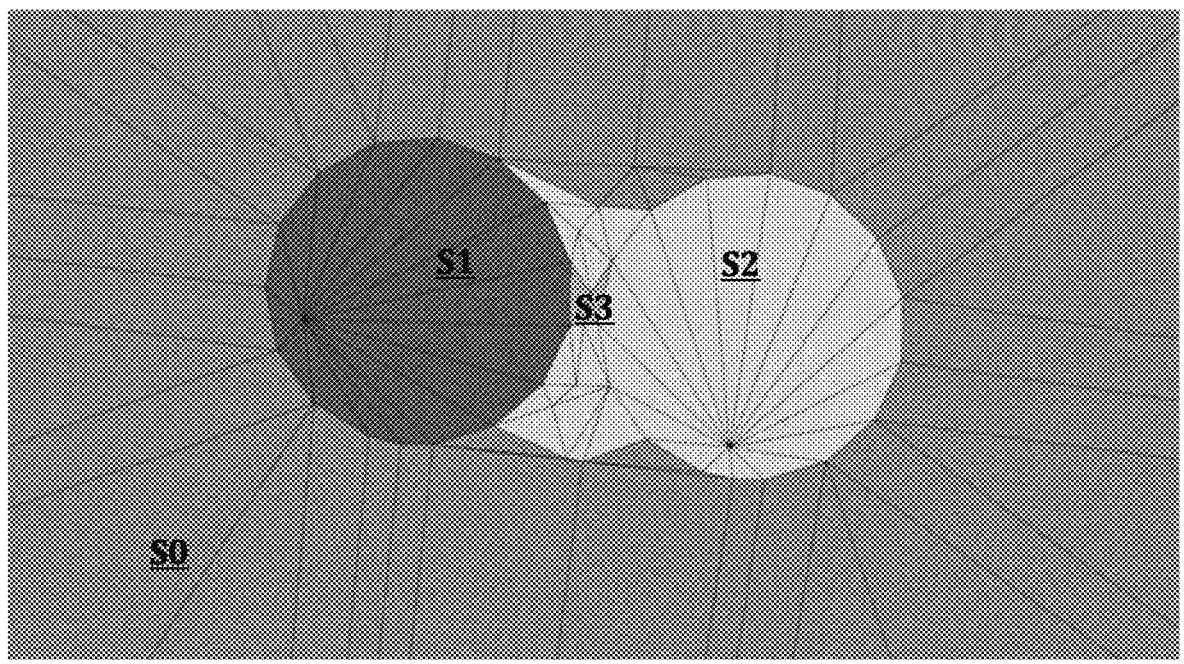

The main goal of this step is to prepare the constraints that will drive the next two steps (see constraint term $C(\omega)$). Mainly, which tetrahedra are necessarily in D0 or necessarily in D1. FIG. 6 illustrates this step for the same location as FIGS. 4-5 with 4 tetrahedra sets labelled from S0 to S3 which can, for example, be initialized in the following way:
S1, S2, S3 as belonging to D1 (because they are fully included inside the bounding box of the geometry);
S0 initialized as belonging to D0 as the complementary.

Moreover, these domains can be used to define a constraint as follow for the next steps of this illustrated application: $C(\omega)$ is true if and only if all tetrahedral in S1∪S3 are classified in D1.

Step 4: Optimization of Classification at Constant Mesh Topology

This step uses a formulation of the wrapping problem as a minimization problem. The basic idea is to determine a relevant classification of all tetrahedra in the volume mesh between two domains D0 and D1 and use the boundary between these domains to define the wrapped surface. Usually, for a common CFD application, D0 would be the fluid domain and D1 the solid domain.

The target is thus to find:

$$\mathrm{argmin}\{(\mathrm{Area}(\partial D(\omega)-S)+\alpha \mathrm{Area}(\partial D(\omega)\cap S)+\mathrm{Area}(\pi D0(\omega)\cap S-\partial D(\omega))), \omega\in\Omega; C(w)\}$$

where
$\Omega$: Set of all tetrahedra {D0,D1}-classifications (2^n tetrahedra possibilities). This means that each $\omega\in\Omega$ is a classification of all tetrahedra in the mesh between domains D0 and D1;
$\partial D(\omega)$: Boundary (represented as triangles) between tetrahedra in D0($\omega$) and D1($\omega$) in classification $\omega$;
S: Input surface tessellation (exists as tetra faces in the mesh);
$\pi D0(\omega)$: the set of faces (triangles) for all tetrahedra classified in D0 in classification $\omega$;
$C(\omega)$: a constraint function whose value is true if and only if the constraint is satisfied for classification $\omega$;
$\alpha$ is a small number. For example 1e-2.

The constraint C is currently used to:
Capture gaps: tetrahedra within a gap can be detected (for example using a ray tracing technique) and be constrained to belong to a given domain. For example, when wrapping a geometry in order to get an external fluid domain, the matter inside gaps must be excluded of the fluid domain. This is represented as represented as C(ω)=false whenever a tetrahedron belonging to a gap is classified in the external fluid domain;

Make sure some specific surfaces are exposed to a domain or not. For example lids closing a fluid domain need to be exposed to the fluid domain on one of their given side.

This constraint system is very flexible and can be used to provide much more control.

The 3 terms in this objective function are:

Area(∂D(ω)−S) is the main term that will allow to minimize the amount of created surface and capture the exact existing input surface;

α Are(∂D(ω)∩S) is a stabilizing term that leads to a lower number of minimal solutions;

A(πD0(ω)∩S−∂D(ω)) is a term improving the method when working on geometries bounded by open surfaces (as opposed to a model made as an assembly of surface shells).

Figure 7:
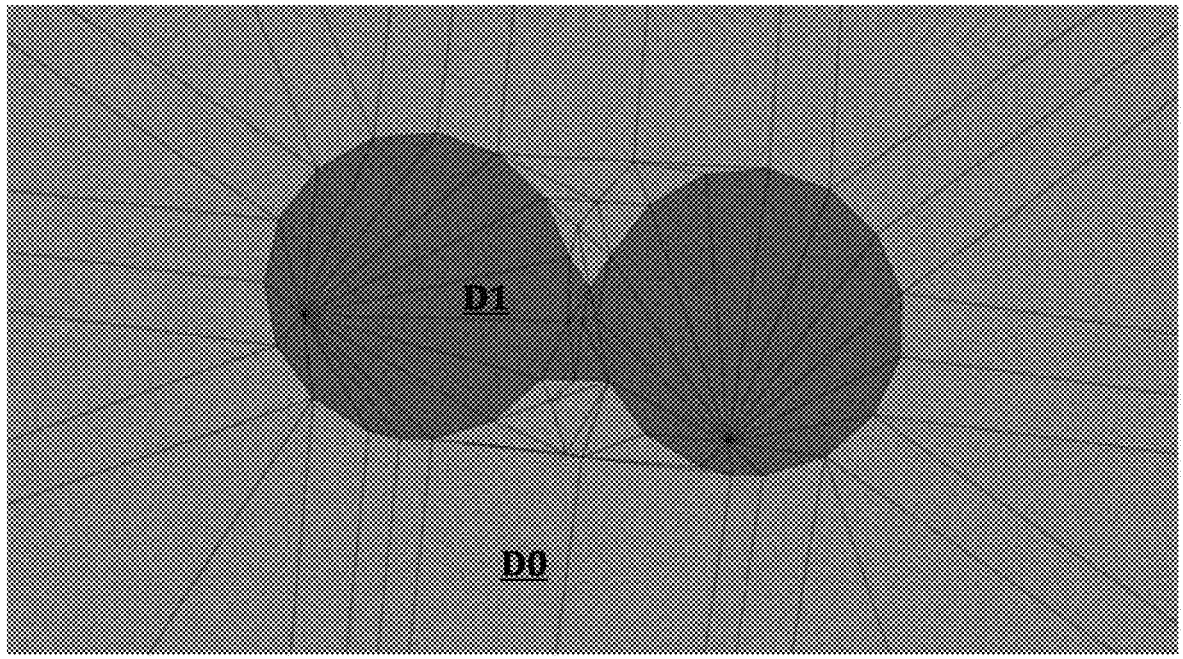

To perform this optimization, this implementation uses a metaheuristic approach close to simulated annealing. FIG. 7 illustrates the result of this optimization process.

Step 5: Optimization of Classification and Mesh Topology

Figure 8:
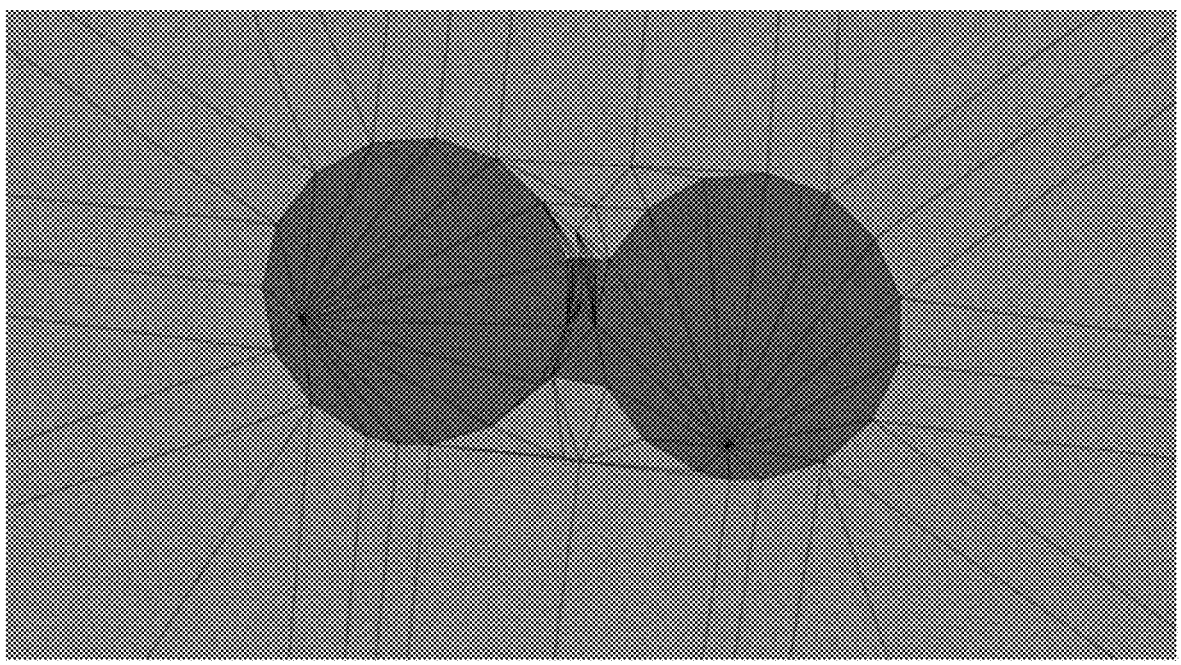

This step targets the same minimization problem as step 4 but extends it by also allowing on the fly modifications of the volume mesh (vertex insertion, edge or face swapping) in order to reach an even better minimizing solution. FIG. 8 illustrates how this step refines the final classification and provides a smoother and more precise classification, especially in the zone of interest between the two cylinders.

Step 6: Creation of Surface Entities to Represent the Wrapped Surface

This step creates explicit triangle entities in order to represent the implicit surface that separates the 2 domains D0 and D1. Since the input surface triangles already exist as tetrahedral faces, in the volume mesh, one only needs to create the extra triangles that have been proposed by this wrapping process in order to separate the domains.

As illustrated in the workflow chart, the step 3 to 6 of this process may be applied iteratively several times with a different initialization (step 3) and different constraints (step 4-5) in order to perform a multi-domain wrap. This is for example the strategy that may be applied in order to extract several wrapped fluid and/or solid domains to model an air-water heat exchanger.

Figure 9:
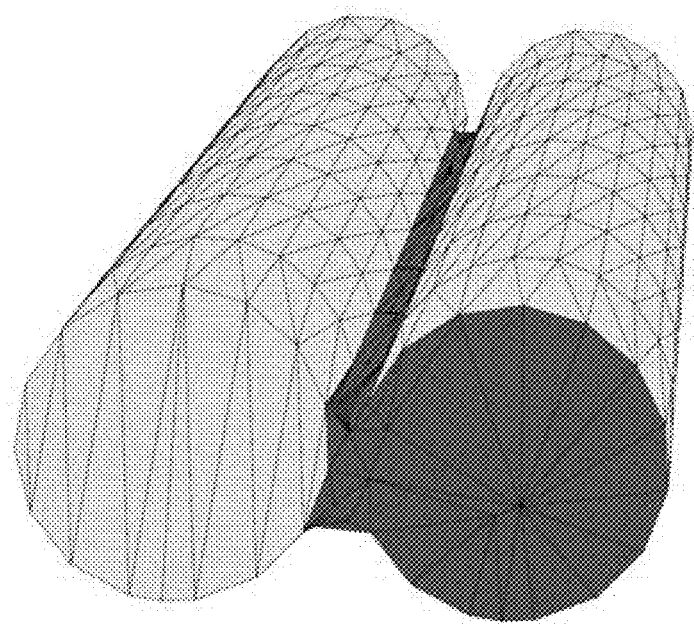

FIG. 9 illustrates the resulting tessellation of the complete process. As expected on this simple use case, one can see that the resulting tessellation is fully compatible, that the gap between the two cylinders has been filled in a relatively smooth and consistent way, and that the open cylinder has been closed.

It is now briefly discussed examples of results that may be obtained by applying the previously-discussed implementation, with reference to FIGS. 10 to 17 (Geometry: courtesy of BMW).

Figure 10:
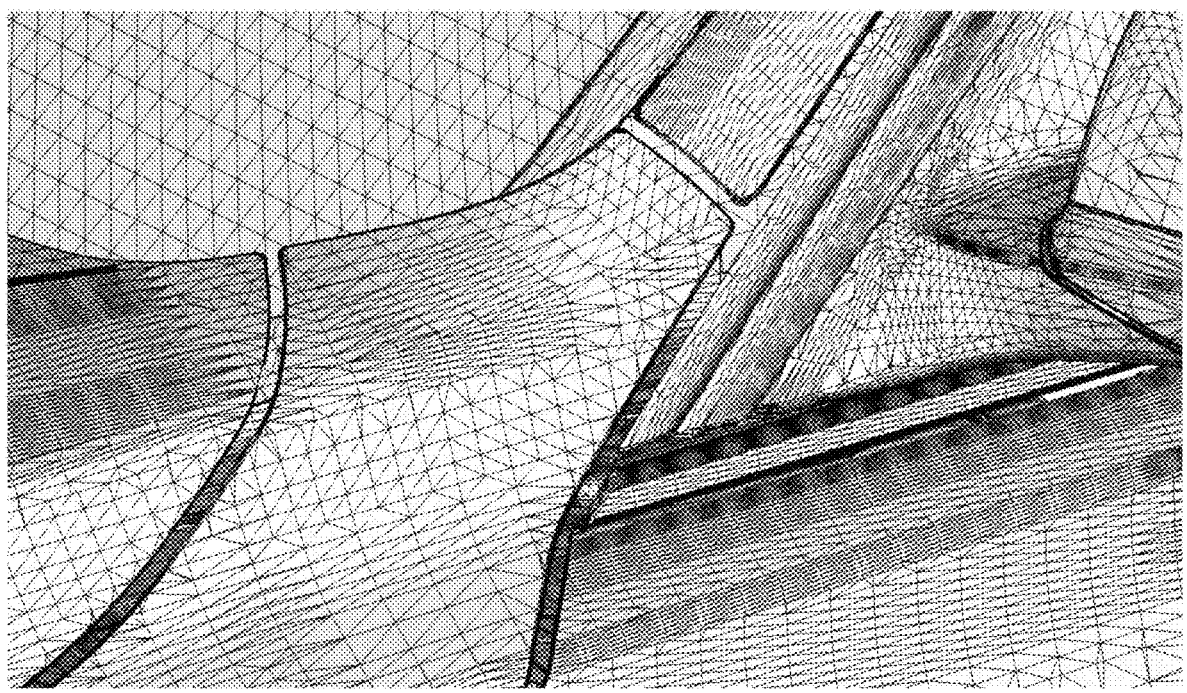
Figure 11:
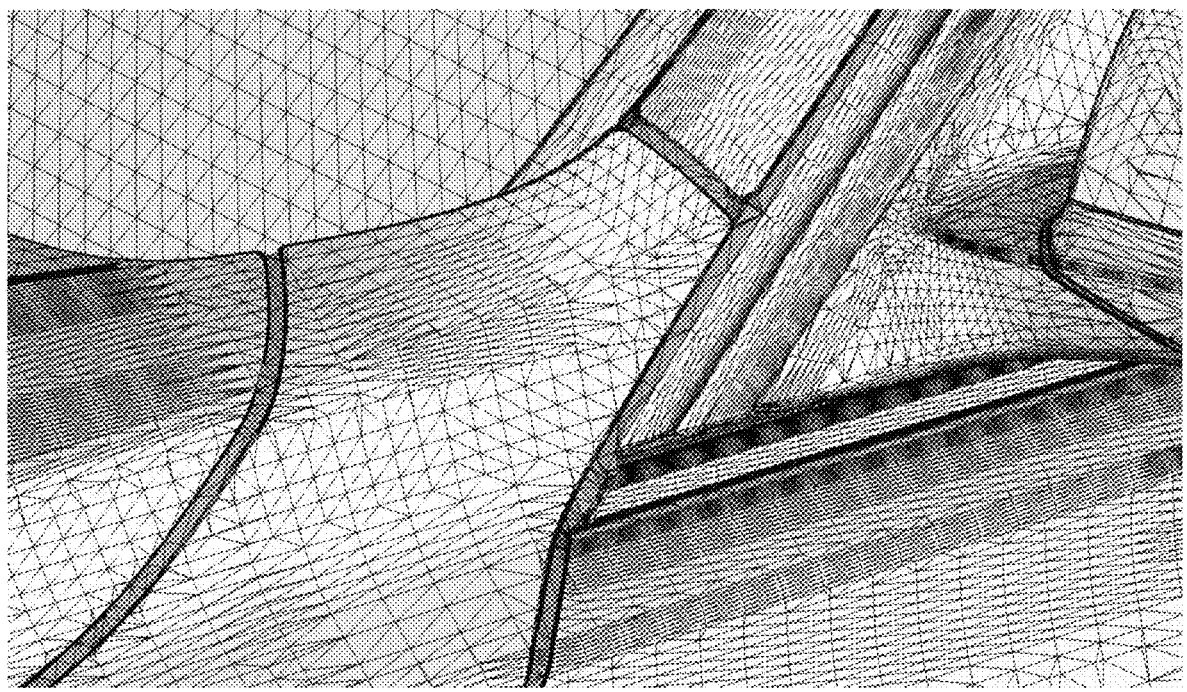

FIG. 10 shows an example the input tessellation, which represent a car body surface portion. FIG. 11 shows the same tessellation once processed by the method.

Figure 12:
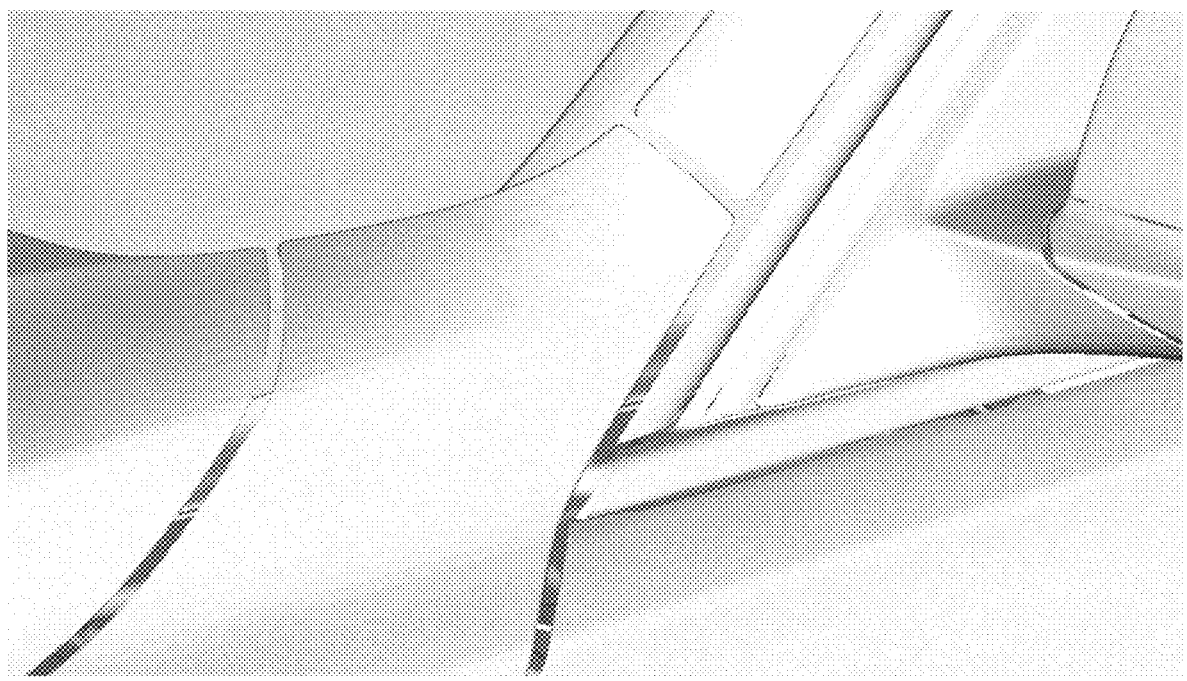
Figure 13:
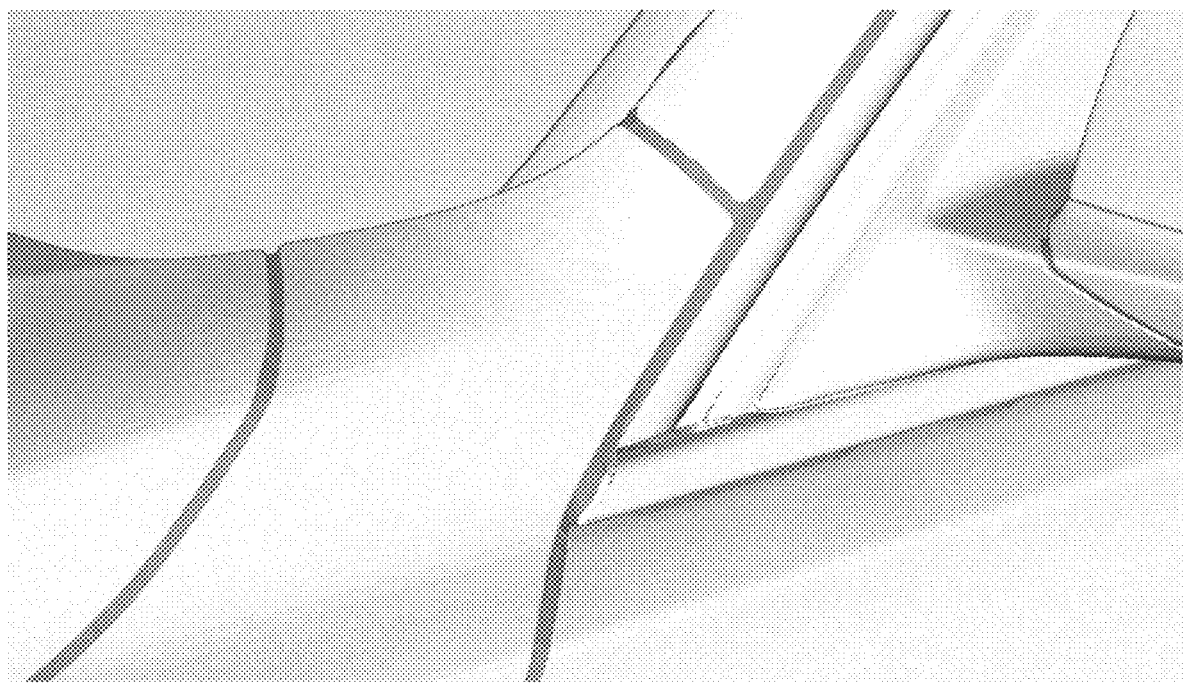

FIG. 12 shows an example the input tessellation, which represent a car body surface portion. FIG. 13 shows the same tessellation once processed by the method.

Figure 14:
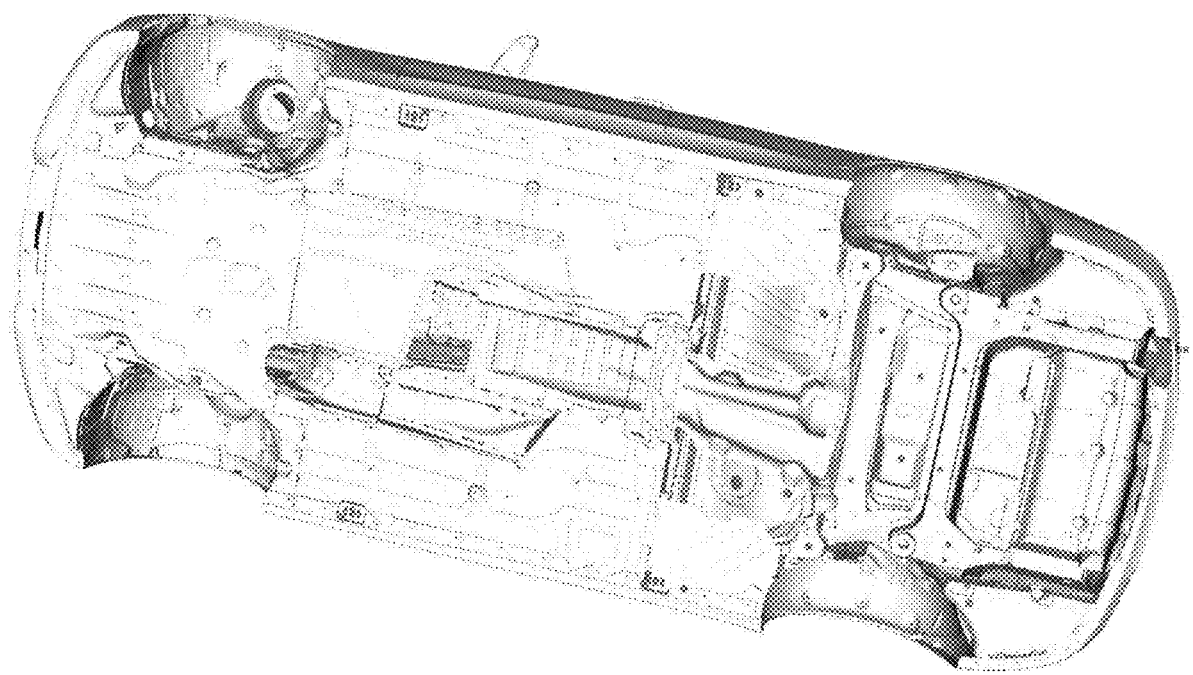
Figure 15:
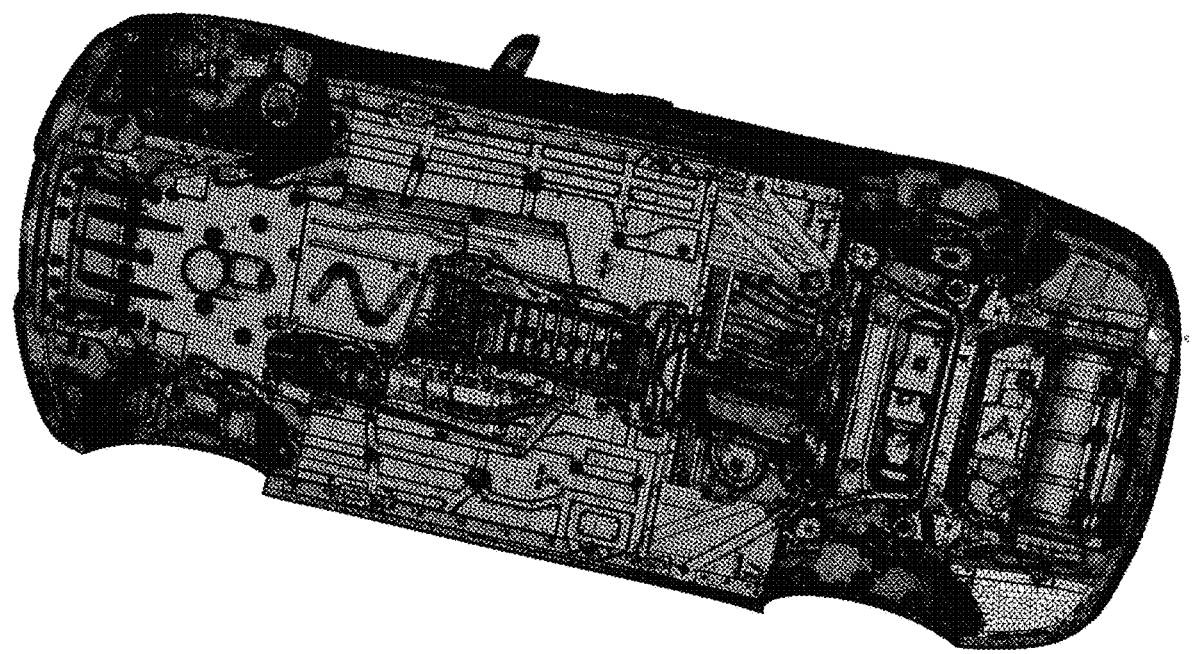

FIG. 14 shows an example the input tessellation, which represent a car body surface portion. FIG. 15 shows the same tessellation once processed by the method.

Figure 16:
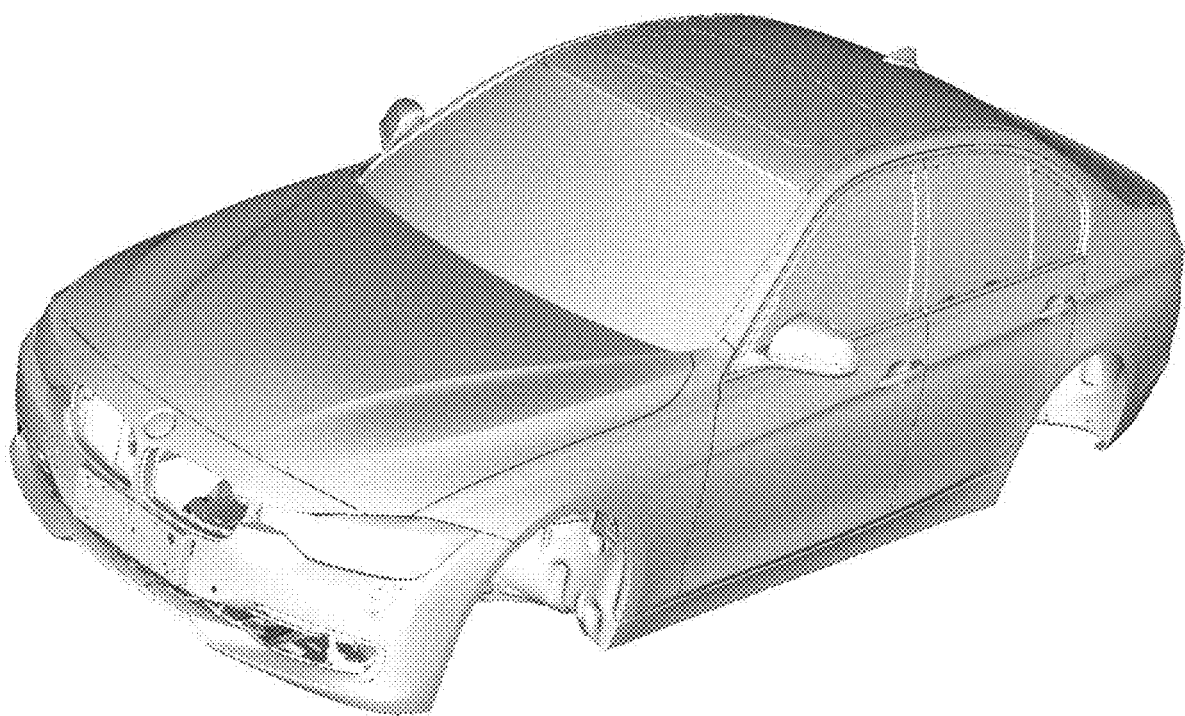
Figure 17:
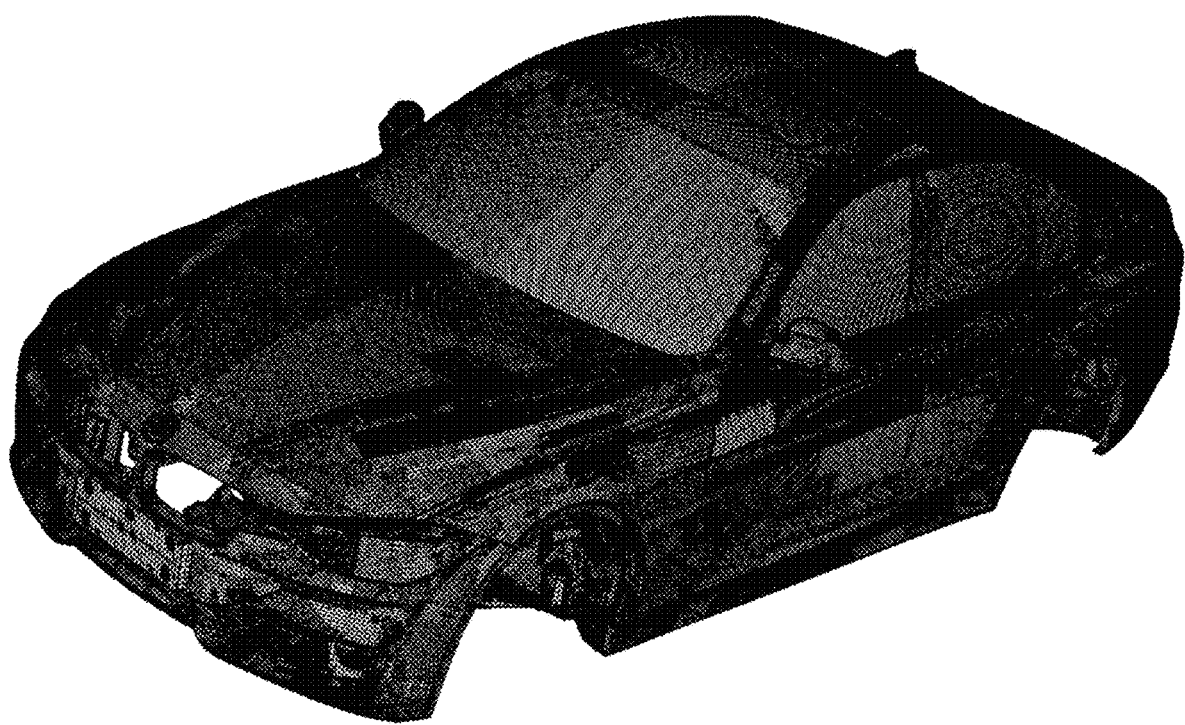

FIG. 16 shows an example the input tessellation, which represent a car body surface portion. FIG. 17 shows the same tessellation once processed by the method.

As it can be seen in all these examples, the method processes the input tessellation and outputs a quality tessellation, with the gaps filled.

As previously discussed, the method may be included in a design and manufacturing process for designing and manufacturing a mechanical product, the real-world object being the mechanical product.

"Designing a mechanical product" designates any action or series of actions which is at least part of a process of elaborating a modeled object of said product. The method thus generally manipulates modeled objects, such as the input tessellation, the output tessellation, the volume mesh matching the output tessellation, and optionally a corresponding CAD model. The modeled object provides a representation of the mechanical product to a computer. A modeled object is any object defined by data stored e.g., in the database. By extension, the expression "modeled object" designates the data itself. The method may comprise creating the modeled object from scratch. Alternatively, the method may comprise providing a modeled object previously created, and then modifying the modeled object.

The modeled object may represent the geometry of a product to be manufactured in the real world subsequent to the completion of its virtual design with for instance a CAD/CAE software solution or CAD/CAE system as described hereinbelow. The modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process. The mechanical product may be a (e.g., mechanical) part or product, or assembly of parts (or equivalently an assembly of parts, as the assembly of parts may be seen as a part itself from the point of view of the method, or the method may be applied independently to each part of the assembly), or more generally any rigid body assembly (e.g., a mobile mechanism). The mechanical product may be one of various and unlimited industrial fields, including: aerospace, architecture, construction, consumer goods, high-tech devices, industrial equipment, transportation, marine, and/or offshore oil/gas production or transportation. The modeled object designed by the method may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

As discussed above, the modeled object may be for example a tessellation or a volume mesh matching this tessellation which is a modeled object representing the mechanical product, and it may be associated with another modeled object representing the mechanical product, such as a CAD model. The tessellation or volume mesh matching it may indeed be obtained from such a CAD model, for example using a meshing (i.e., triangulation) process. Conversely, the tessellation or volume mesh matching it may be converted into a CAD model. The method may be for designing such a tessellation or volume mesh matching it or a CAD model converted therefrom. The method may comprise providing an initial CAD model, and obtaining the input tessellation from the CAD model, and/or converting the output tessellation or volume mesh matching it back into a CAD model, thereby obtaining an updated CAD model. The CAD model may be a 3D CAD model. The method may thus be for designing a 3D modeled object representing the mechanical product.

According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD, CAE, and PLM system.

By CAD solution, it is additionally meant any system, software of hardware, adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

By CAE solution, it is additionally meant any solution, software of hardware, adapted for the analysis of the physical behavior of a modeled object. A well-known and widely used CAE technique is the Finite Element Model (FEM) which is equivalently referred to as CAE model hereinafter. An FEM typically involves a division of a modeled object into elements, i.e., a finite element mesh, which physical behaviors can be computed and simulated through equations. Such CAE solutions are provided by Dassault Systèmes under the trademark SIMULIA®. Another growing CAE technique involves the modeling and analysis of complex systems composed a plurality of components from different fields of physics without CAD geometry data. CAE solutions allow the simulation and thus the optimization, the improvement and the validation of products to manufacture. Such CAE solutions are provided by Dassault Systèmes under the trademark DYMOLA®.

As previously discussed, designing the mechanical product by obtaining the output tessellation or a volume mesh matching it (i.e., a CAE model of the product) allows to assist design processes and manufacturing processes, whereby the objective is to produce a mechanical product corresponding to the designed model. Within this content, the output tessellation or volume mesh is a model which represents the mechanical product that may be manufactured downstream to its design for example upon a conversion to a respective CAD model. The method may thus be part of such a design and/or manufacturing process and used to obtain a tessellation or volume mesh of the mechanical product. As discussed above, the method may convert such the output tessellation or volume mesh into a respective CAD model. Said design and/or manufacturing process may use the tessellation or volume mesh, or the converted CAD model thereof, in further steps of design, edition actions, tests, simulations and/or manufacturing. The method may in other words be included in a design and manufacturing CAE process, at a step where the CAE model of a mechanical product is obtained and/or where the design variables of the CAE model are determined. Such process may be referred to as "the production process" and may comprise, after performing the method, producing a physical product corresponding to the real-world object.

It is further proposed such a production process comprising designing a mechanical product by designing the input tessellation, processing it by performing the method, optionally finding a volume meshing of the product that matches the output tessellation, optionally performing simulations, optionally performing further design/edition steps, and producing the mechanical part. The production process may use the output of the method or of the whole design process to obtain a CAD model of the designed mechanical product which can be fabricated by known fabrication methods. The production of the mechanical product may comprise any known fabrication step, for example one or more additive manufacturing steps, one or more cutting steps (e.g., laser cutting or plasma cutting steps), one or more stamping steps, one or more forging steps, one or more molding steps, one or more machining steps (e.g., milling steps) and/or one or more punching steps. Because the method improves the design of a model representing a mechanical product, the production method also improves the manufacturing of the mechanical product and thus increases productivity of the manufacturing process (i.e., production process).

Further to the design, the processed tessellation or said volume mesh matching it may be (e.g., fully automatically, by any known fully automated CAE-to-CAD model conversion process/algorithm) converted into a CAD model, for example at the (beginning of the) producing step of the production process. The production process may then import such a CAD model (e.g., fully automatically) into a CAD manufacturing process to fabricate the mechanical product. Such an imported CAD model at least significantly corresponds to such a mechanical product to be fabricated by the CAD manufacturing process. In other words, the imported CAD model may be subject to further editing after the conversion of the final output of the method with respect to fabrication criteria, for example milling direction or molding constraints, and/or finishing or fitting tolerances.

The production process may thus comprise the following sequence of steps:
- (e.g., automatically) applying the method, thereby obtaining said processed tessellation or said volume mesh matching it;
- (e.g., automatically) converting the processed tessellation or said volume mesh matching it into a CAD model as previously discussed;
- optionally (i.e., depending on the manufacturing process used, the production of the mechanical product may or may not comprise this step) (e.g., automatically) determining a production file and/or CAM file based on the CAD model, for production/manufacturing of the manufacturing product;
- (e.g., automatically) producing/manufacturing, based on the determined production file or on the CAD model, the mechanical product originally represented by the tessellation.

Converting the processed tessellation or said volume mesh matching it into a CAD model may comprise executing the following (e.g., fully automatic) conversion process that takes as input a tessellation or volume mesh and converts it into a CAD model comprising a feature-tree representing the modeled mechanical product. The conversion process includes the following steps (where known fully automatic algorithms exist to implement each of these steps):
- segmenting the processed tessellation or said volume mesh matching it, thereby obtaining a segmentation of processed tessellation or said volume mesh matching it into segments, e.g., each representing a surface portion of the object;
- detecting geometries of CAD features by processing the segments, e.g., including detecting segments or groups of segments each forming a given CAD feature geometry (e.g., an extrusion, a revolution, or any canonic primitive), and optionally geometric characteristics thereof (e.g., extrusion axis, revolution axis, or profiles);
- parameterizing the detected geometries, e.g., based on the geometries and/or on said geometric characteristics thereof;
- fitting CAD operators each to a respective portion of the processed tessellation or said volume mesh matching it, based on a geometry of said portion, for example by aggregating neighboring segments detected as being part of a same feature geometry;
- encoding the geometries and the corresponding CAD operators into a feature tree;
- optionally, executing the feature tree, thereby obtaining a B-rep representation of the product;
- outputting the feature tree and optionally the B-rep, the feature tree and optionally the B-rep forming the CAD model.

The production file may comprise a manufacturing step up model obtained from the CAD model. The manufacturing step up may comprise all data required for manufacturing the mechanical product so that it has a geometry and/or a distribution of material that corresponds to what is captured by the CAD model, possibly up to manufacturing tolerance errors. Determining the production file may comprise applying any CAM (Computer-Aided Manufacturing) solution for (e.g., automatically) determining a production file from the CAD model (e.g., any automated CAD-to-CAM conversion algorithm).

By CAM solution, it is meant any solution, software of hardware, adapted for managing the manufacturing data of a product. The manufacturing data generally include data related to the product to manufacture, the manufacturing process and the required resources. A CAM solution is used to plan and optimize the whole manufacturing process of a product. For instance, it may provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. For example, a CAM solution may provide the information regarding machining parameters, or molding parameters coherent with a provided extrusion feature in a CAD model. Such CAM solutions are provided by Dassault Systèmes under the trademarks CATIA, Solidworks or trademark DELMIA®.

CAD and CAM solutions are therefore tightly related. Indeed, a CAD solution focuses on the design of a product or part and CAM solution focuses on how to make it. Designing a CAD model is a first step towards a computer-aided manufacturing. Indeed, CAD solutions provide key functionalities, such as feature based modeling and boundary representation (B-Rep), to reduce the risk of errors and the loss of precision during the manufacturing process handled with a CAM solution. Indeed, a CAD model is intended to be manufactured. Therefore, it is a virtual twin, also called digital twin, of an object to be manufactured with two objectives:
- checking the correct behavior of the object to be manufactured in a specific environment; and
- ensuring the manufacturability of the object to be manufactured.

The mechanical product may be an additive manufacturable part, i.e., a part to be manufactured by additive manufacturing (i.e., 3D printing). In this case, the production process does not comprise the step of determining the production file and directly proceeds to the producing/manufacturing step, by, further to the conversion of the output tessellation or said volume mesh matching it into the CAD model, directly and automatically feeding a 3D printer with the CAD model. 3D printers are configured for, upon being fed with a CAD model representing a mechanical product, directly and automatically 3D print the mechanical product in accordance with the CAD model. In other words, the 3D printer receives the CAD model, which is automatically fed to it, automatically reads the CAD model, and automatically manufactures the mechanical part by adding together material, e.g., layer by layer, to reproduce the geometry and/or distribution of material captured by the CAD model. The 3D printer adds the material to thereby reproduce exactly in reality the geometry and/or distribution of material captured by the CAD model, up to the resolution of the 3D printer, and optionally with or without tolerance errors and/or manufacturing corrections. The manufacturing process may comprise determining automatically from the CAD model, determining a printing direction, for example to minimize overhang volume (such as described in European patent No. 3327593, which is incorporated herein by reference), a layer-slicing (i.e., determining thickness of each layer, and layer-wise paths/trajectories and other characteristics for the 3D printer head (e.g., fora laser beam, for example the path, speed, intensity/temperature, and other parameters).

The mechanical product may alternatively be a machined part (i.e., a part manufactured by machining), such as a milled part (i.e., a part manufactured by milling). In such a case, the production process may comprise a step of determining the production file. This step may be carried out automatically, by any suitable CAM solution to automatically obtain a production file from a CAD model of a machined part. The determination of the production file may comprise automatically checking if the CAD model has any geometric particularity (e.g., error or artefact) that may affect the manufacturing process and automatically correcting such particularities. For example, machining or milling based on the CAD model may not be carried out if the CAD model still comprises sharp edges (because the machining or milling tool cannot create sharp edges), and in such a case the determination of the production file may comprise automatically rounding or filleting such sharp edges (e.g., with a round or fillet radius that corresponds, e.g., substantially equals up to a tolerance error, the radius of the cutting head of the machining tool), so that machining or milling based on the CAD model can be done. More generally, the determination of the production file may automatically comprise rounding or filleting geometries within the CAD model that are incompatible with the radius of the machining or milling tool, to enable machining/milling. Further to the check, the determination of the production file may comprise automatically determining the machining or milling path, i.e., the path to be taken by the machining tool to machine the product. The path may comprise a set of coordinates and/or a parameterized trajectory to be followed by the machining tool for machining, and determining the path may comprise automatically computing these coordinates and/or trajectory based on the CAD model. This computation may be based on the computation of a boundary of a Minkowski subtraction of the CAD model by a CAD model representation of the machining tool, as for example discussed in European Patent Application EP21306754.9 filed on 13 Dec. 2021 by Dassault Systèmes, and which is incorporated herein by reference. It is to be understood that the path may be a single path, e.g., that the tool continuously follows without breaking contact with the material to be cut. Alternatively, the path may be a concatenation of a sequence sub-paths to be followed in a certain order by the tool, e.g., each being continuously followed by the tool without breaking contact with the material to be cut. Optionally, the determination of the production file may then comprise automatically setting machine parameters, including cutting speed, cut/pierce height, and/or mold opening stroke, for example based on the determined path and on the specification of the machine. Optionally, the determination of the production file may then comprise automatically configuring nesting where the CAM solution decides the best orientation for a part to maximize machining efficiency. In this case of a machining or milling part, the determining of the production file thus results, and outputs, a file comprising a machining path, and optionally the set machine parameters and/or specifications of the configured nesting. This outputted file may be then (e.g., directly and automatically) fed to the machining tool and/or the machining tool may then (e.g., directly and automatically) be programmed by reading the file, upon which the production process comprises the producing/manufacturing step where the machine performs the machining of the product according to the production file, e.g., by directly and automatically executing the production file. The machining process comprises the machining tool cutting a real-world block of material to reproduce in the geometry and/or distribution of material captured by the CAD model, e.g., up to a tolerance error (e.g., tens of microns for milling).

The mechanical product may alternatively be a molded part, i.e., a part manufactured by molding (e.g., injection-molding). In such a case, the production process may comprise the step of determining the production file. This step may be carried out automatically, by any suitable CAM solution to automatically obtain a production file from a CAD model of a molded part. The determining of the production file may comprise automatically performing a sequence of molding checks based on the CAD model to check that the geometry and/or distribution of material captured by the CAD model is adapted for molding, and automatically performing the appropriate corrections if the CAD model is not adapted for molding. The checks may include: verifying that the virtual product as represented by the CAD model is consistent with the dimensions of the mold and/or verifying that the CAD model comprises all the draft angles required for demolding the product, as known per se from molding. The determining of the production file may then further comprise determining, based on the CAD model, a quantity of liquid material to be used for molding, and/or a time to let the liquid material harden/set inside the mold, and outputting a production file comprising these parameters. The production process then comprises (e.g., automatically) performing the molding based on the outputted file, where the mold shapes, for the determined hardening time, a liquid material into a shape that corresponds to the geometry and/or distribution of material captured by the CAD model, e.g., up to a tolerance error (e.g., up to the incorporation of draft angles or to the modification of draft angles, for demolding).

The mechanical product may alternatively be a stamped part, also possibly referred to as "stamping part", i.e., a part to be manufactured in a stamping process. The production process may in this case comprise automatically determining a production file based on the CAD model. The CAD model represents the stamping part, e.g., possible with one or more flanges if the part is to comprise some, and possibly in this latter case with extra material to be removed so as to form an unfolded state of one or more flanges of the part. The CAD model thus comprises a portion that represents the part without the flanges (which is the whole part in some cases) and possibly an outer extra patch portion that represents the flanges, with possibly the extra material (if any). This extra patch portion may present a g2-continuity over a certain length and then a g1-continuity over a certain length. The determination of the production file may automatically comprise determining parameters of the stamping machine, for example a size of a stamping die or punch and/or a stamping force, based on the geometry and/or distribution of material of the virtual product as captured by the CAD model. If the CAD model also comprises the representation of the extra material to be removed so as to form an unfolded state of one or more flanges of the part, the extra material to be removed may for example be cut by machining, and determining the production file may also comprise determining a corresponding machining production file, e.g., as discussed previously. If there are one or more flanges, determining the production file may comprise determining geometrical specifications of the g2-continuity and g1-continuity portions that allow, after the stamping itself and the removal of the extra material, to fold in a folding process the flanges towards an inner surface of the stamped part and along the g2-continuity length. The production file thereby determined may thus comprise: parameters of the stamping tool, optionally said specifications for folding the flanges (if any), and optionally a machining production file for removing the extra material (if any). The production process may then output, e.g., directly and automatically, the file, and perform the stamping process (e.g., automatically) based on the file. The stamping process may comprise stamping (e.g., punching) a portion of material to form the product as represented by the CAD file, that is possibly with the unfolded flanges and the extra material (if any). Where appropriate, the stamping process may then comprise cutting the extra material based on the machining production file and folding the flanges based on said specifications for folding the flanges, thereby folding the flanges on their g2-continuity length and giving a smooth aspect to the outer boundary of the part. In this latter case, the shape of the part once manufactured differ from its virtual counterpart as represented by the CAD model in that the extra material is removed and the flanges are folded, whereas the CAD model represents the part with the extra material and the flanges in an unfolded state.

The CAD model may be feature-based (e.g., it may comprise in a feature tree, and optionally a corresponding B-rep obtained by executing the feature tree). A feature-based 3D model allows (e.g., during the determining of the production file) the detection and an automatic resolution of a geometry error in a CAD model such as a clash that will affect the manufacturing process. A clash is an interpenetration between two parts of a 3D model for example due to their relative motion. Furthermore, this clash may sometimes only be detected via a finite element analysis based on the CAD feature-based model. Therefore, a resolution of a clash can be performed with or automatically by the CAD solution by iteratively modifying the parameters of the features and doing a finite element analysis.

As another example, a feature-based 3D model allows (e.g., at the step of determining a production file) an automatic creation of a toolpath for a machine via a computer numerical control (CNC). With CNC, each object to be manufactured gets a custom computer program, stored in and executed by the machine control unit, a microcomputer attached to the machine. The program contains the instructions and parameters the machine tool will follow. Mills, lathes, routers, grinders and lasers are examples of common machine tools whose operations can be automated with CNC.

The generation of a custom computer program from CAD files may be automated. Such generation may therefore be error prone and may ensure a perfect reproduction of the CAD model to a manufactured product. CNC is considered to provide more precision, complexity and repeatability than is possible with manual machining. Other benefits include greater accuracy, speed and flexibility, as well as capabilities such as contour machining, which allows milling of contoured shapes, including those produced in 3D designs.

The B-rep (i.e., boundary representation) is a 3D representation of a mechanical part. Specifically, the B-rep is a persistent data representation describing the 3D modeled object representing the mechanical part. The B-rep may be the result of computations and/or a series of operations carried out during a designing phase of the 3D modeled object representing the mechanical part. The shape of the mechanical part displayed on the screen of the computer when the modeled object is represented is (e.g., a tessellation of) the B-rep. In examples, the B-rep represents a part of the model object.

A B-Rep includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other as follows. The bounded portion of a curve is defined by two points (the vertices) lying on the curve. The bounded portion of a surface is defined by its boundary, this boundary being a set of edges lying on the surface. The boundary of the edges of the face are connected by sharing vertices. Faces are connected by sharing edges. Two faces are adjacent if they share an edge. Similarly, two edges are adjacent if they share a vertex. In the CAD system, the B-Rep gathers in an appropriate data structure the "is bounded by" relationship, the relationship between topological entities and supporting geometries, and mathematical descriptions of supporting geometries. An internal edge of a B-Rep is an edge shared by exactly two faces. By definition, a boundary edge is not shared, it bounds only one face. By definition, a boundary face is bounded by at least one boundary edge. A B-Rep is said to be closed if all its edges are internal edges. A B-Rep is said to be open is it includes at least one boundary edge. A closed B-Rep is used to model a thick 3D volume because it defines the inside portion of space (virtually) enclosing material. An open B-Rep is used to model a 3D skin, which represents a 3D object the thickness of which is sufficiently small to be ignored.

A key advantage of the B-Rep over any other representation types used in CAD modeling is its ability to represent arbitrary shapes exactly. All other representations in use, such as point clouds, distance fields and meshes, perform an approximation of the shape to represent by discretization. The B-Rep, on the other hand, contains surface equations that represent the exact design and therefore constitutes a true "master model" for further manufacturing, whether this be generation of toolpaths for CNC, or discretizing into the correct sample density for a given 3D Printer technology. In other words, by using a B-Rep, the 3D model may be an exact representation of the manufactured object. The B-Rep is also advantageous for simulating the behavior of a 3D model. In terms of stress, thermal, electromagnetic or other analysis, it supports local refinement of the simulation meshes to capture physical phenomena, and for kinematics it supports true contact modeling between curved surfaces. Finally, a B-Rep allows a small memory and/or file footprint. First, because the representation contains surfaces based only on parameters. In other representations such as meshes, the equivalent surface comprises up to thousands of triangles. Second, because a B-Rep doesn't contain any history-based information.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. In the case of the method, each step of the method may be automatically carried out, so that the method may be fully automated.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 18:
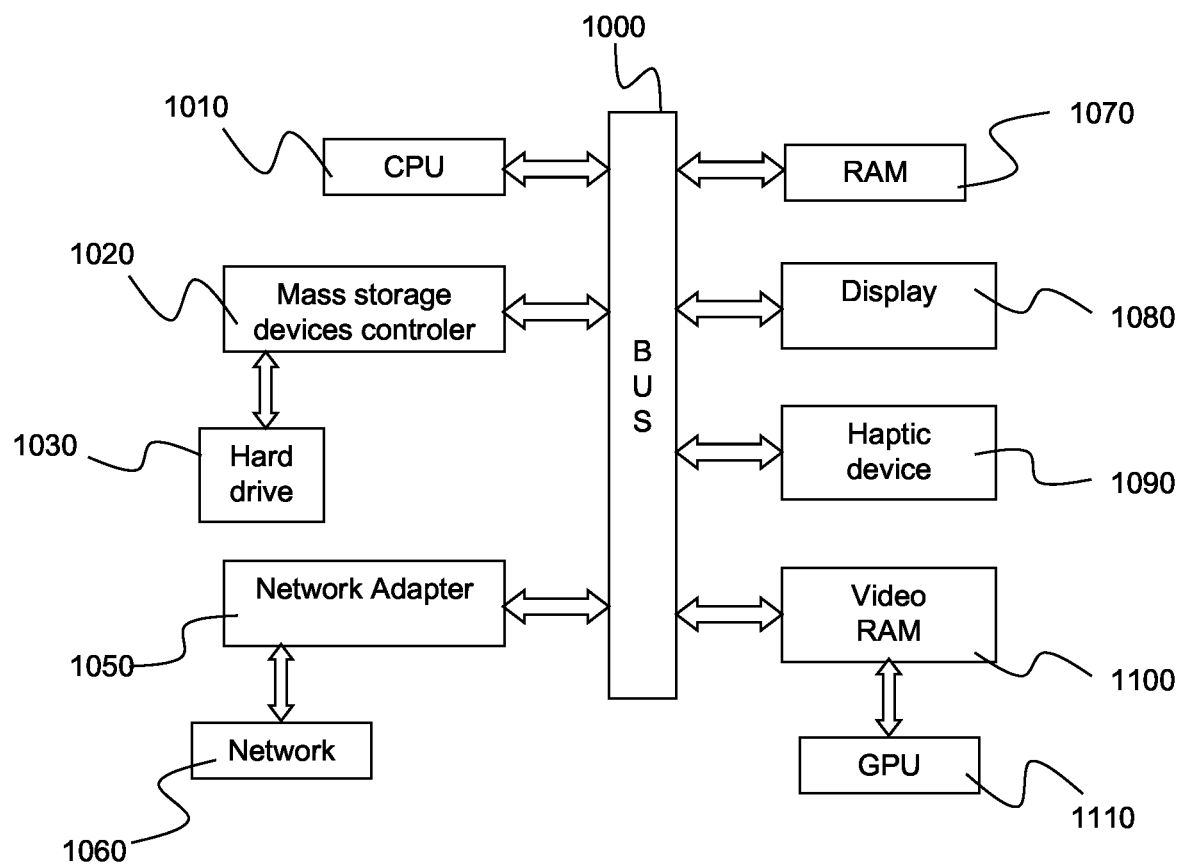
FIG. 18 shows an example of the system.

FIG. 18 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

The invention claimed is:

1. A computer-implemented method for processing a tessellation forming a surface representation of a real-world 3D object, the method comprising:
    obtaining a constrained tetrahedral Delaunay mesh including the tessellation, the Delaunay mesh being conformal and including one or more sets of tetrahedrons each representing a respective gap between portions of the tessellation, each respective gap having a size lower than a predefined threshold; and
    determining a set of one or more tetrahedra faces of the Delaunay mesh to be added to the tessellation, the determining including minimizing an objective function that includes a term penalizing surface creation by face addition to the tessellation, the minimization being under a constraint that a given set of tetrahedra faces of the Delaunay mesh is to be added to the tessellation, the given set of tetrahedra faces including, for each gap of one or more gaps, the tetrahedra faces meshing the gap,
    wherein the minimization includes obtaining an initial classification of the tetrahedrons of the Delaunay mesh into a first group and a second group, the first group including tetrahedrons that are inside a bounding box of the tessellation, the minimization having as free variable a classification of the tetrahedrons into the first and second groups, the constraint being that tetrahedrons meshing said one or more gaps belong to the first group, and
    wherein the minimization outputs a classification of the tetrahedrons into the first and second groups that defines an interface between the first group and the second group, and the determining of a set of one or more tetrahedra faces of the Delaunay mesh to be added to the tessellation further includes another minimization to further minimize the objective function by modifying the interface between the first group and the second group.

2. The computer-implemented method of claim 1, wherein said another minimization comprises:
    traversing points of the Delaunay mesh which are on the interface but not on the tessellation, and assessing for each point whether moving the point, by bringing the point closer to another point of the interface along a direction of an edge having the point as vertex, further minimizes the objective function; and
    determining one or more angles, each determined angle being respective to a traversed point and being an angle formed by two triangles of the Delaunay mesh that both belong to the interface and that intersect at the traversed point, each determined angle having a value smaller than a predefined threshold, and for each determined angle, inserting a point that is to be part of the interface, the point being either inserted on an existing edge, thereby dividing the existing edge, or inserted on no existing edge in which case new edges are created for connecting the point to the interface, the created edges being also part of the interface, the insertion of the point being performed to further optimize the objective function and thereby to flatten the angle.

3. The computer-implemented method of claim 1, wherein the term is of a type $$\text{Area}(\partial D(\omega) - S),$$

where $\omega \in \Omega$ and $\Omega$ is the set of all tetrahedra classifications in the first and second groups, $\partial D(\omega)$ is the interface between the first and second groups in the classification $\omega$, S is the tessellation.

4. The computer-implemented method of claim 3, wherein the objective function further comprises a term of a type:

$$\alpha \text{Area}(\partial D(\omega) \cap S)$$

where $\alpha$ is a positive real number.

5. The computer-implemented method of claim 3, wherein the objective function further comprises a term of a type:

$$\text{Area}(\pi D0(\omega) \cap S - \partial D(\omega)),$$

where $\pi D0(\omega)$ is the set of faces for all tetrahedra classified in the second group D0 in classification $\omega$.

6. The computer-implemented method of claim 1, wherein the obtaining of the constrained tetrahedral Delaunay mesh further comprises:
obtaining the tessellation, and
making the tessellation conformal and inserting the tessellation in a tetrahedral Delaunay mesh by determining a tetrahedral Delaunay mesh that includes, as part of the mesh, the tessellation, the determined tetrahedral Delauney mesh forming the obtained constraint tetrahedral Delaunay mesh.

7. The computer-implemented method of claim 1, further comprising, prior to the determining of a set of one or more tetrahedra faces of the Delaunay mesh to be added to the tessellation:
locally refining the tetrahedral mesh of each gap.

8. The computer-implemented method of claim 1, wherein the determining of a set of one or more tetrahedra faces of the Delaunay mesh to be added to the tessellation is iterated, each iteration comprising, before the minimization, modifying the given set of tetrahedra faces.

9. The computer-implemented method of claim 1, wherein the surface represents an outer surface of a car body.

10. A non-transitory computer-readable data storage medium having recorded thereon a computer program comprising instructions for performing a method for processing a tessellation forming a surface representation of a real-world 3D object, the method comprising:
obtaining a constrained tetrahedral Delaunay mesh including the tessellation, the Delaunay mesh being conformal and comprising one or more sets of tetrahedrons each representing a respective gap between portions of the tessellation, each respective gap having a size lower than a predefined threshold; and
determining a set of one or more tetrahedra faces of the Delaunay mesh to be added to the tessellation, the determining including minimizing an objective function that includes a term penalizing surface creation by face addition to the tessellation, the minimization being under a constraint that a given set of tetrahedra faces of the Delaunay mesh is to be added to the tessellation, the given set of tetrahedra faces including, for each gap of one or more gaps, the tetrahedra faces meshing the gap,
wherein the minimization includes obtaining an initial classification of the tetrahedrons of the Delaunay mesh into a first group and a second group, the first group including tetrahedrons that are inside a bounding box of the tessellation, the minimization having as free variable a classification of the tetrahedrons into the first and second groups, the constraint being that tetrahedrons meshing said one or more gaps belong to the first group, and
wherein the minimization outputs a classification of the tetrahedrons into the first and second groups that defines an interface between the first group and the second group, and the determining of a set of one or more tetrahedra faces of the Delaunay mesh to be added to the tessellation further includes another minimization to further minimize the objective function by modifying the interface between the first group and the second group.

11. The non-transitory computer-readable data storage medium of claim 10, wherein said another minimization comprises:
traversing points of the Delaunay mesh which are on the interface but not on the tessellation, and assessing for each point whether moving the point further minimizes the objective function;
determining one or more angles formed at the traversed points by edges of the mesh and having a value lower than a predefined threshold, and for each determined angle, inserting a point that is to be part of the interface to flatten the angle.

12. A computer system comprising:
a processor coupled to a memory, the memory having recorded thereon a computer program including instructions for processing a tessellation forming a surface representation of a real-world 3D object that when executed by the processor causes the processor to be configured to:
obtain a constrained tetrahedral Delaunay mesh comprising the tessellation, the Delaunay mesh being conformal and comprising one or more sets of tetrahedrons each representing a respective gap between portions of the tessellation, each respective gap having a size lower than a predefined threshold, and
determine a set of one or more tetrahedra faces of the Delaunay mesh to be added to the tessellation, the determining including minimizing an objective function that includes a term penalizing surface creation by face addition to the tessellation, the minimization being under a constraint that a given set of tetrahedra faces of the Delaunay mesh is to be added to the tessellation, the given set of tetrahedra faces including, for each gap of one or more gaps, the tetrahedra faces meshing the gap,
wherein the minimization includes obtaining an initial classification of the tetrahedrons of the Delaunay mesh into a first group and a second group, the first group including tetrahedrons that are inside a bounding box of the tessellation, the minimization having as free variable a classification of the tetrahedrons into the first and second groups, the constraint being that tetrahedrons meshing said one or more gaps belong to the first group, and
wherein the minimization outputs a classification of the tetrahedrons into the first and second groups that defines an interface between the first group and the second group, and the determining of a set of one or more tetrahedra faces of the Delaunay mesh to be added to the tessellation further includes another minimization to further minimize the objective function by modifying the interface between the first group and the second group.

13. The computer system of claim 12, wherein said another minimization includes:

traversing points of the Delaunay mesh which are on the interface but not on the tessellation, and assessing for each point whether moving the point further minimizes the objective function; and determining one or more angles formed at the traversed points by edges of the mesh and having a value lower than a predefined threshold, and for each determined angle, inserting a point that is to be part of the interface to flatten the angle.

\* \* \* \* \*